(12) United States Patent
Aldrich et al.

(10) Patent No.: US 7,444,627 B2
(45) Date of Patent: Oct. 28, 2008

(54) SYSTEM AND METHOD FOR CREATING A PERFORMANCE TOOL AND A PERFORMANCE TOOL YIELD

(75) Inventors: Daniel J. Aldrich, Countryside, KS (US); Frank M. Waterman, Olathe, KS (US); Ignacio Andrade, III, Kansas City, KS (US); Horace W. Duncan, III, Overland Park, KS (US); Brian D. Haner, Ottawa, KS (US); Lorna M. Jarrett, Olathe, KS (US); Christopher L. Langston, Raymore, MO (US); Mathew A. Maynor, Liberty, MO (US); Peter A. Meeks, Liberty, MO (US); John H. Oliver, III, Olathe, KS (US); Regina H. O'Meara, Lenexa, KS (US); Kenneth W. Van Booven, Overland Park, KS (US); Michael S. Waterman, Olathe, KS (US); Logan Wade, Liberty, MO (US); Todd D. Way, Overland Park, KS (US); Chris M. Worley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 876 days.

(21) Appl. No.: 10/920,878

(22) Filed: Aug. 18, 2004

(65) Prior Publication Data

US 2005/0022159 A1 Jan. 27, 2005

Related U.S. Application Data

(63) Continuation of application No. 10/017,895, filed on Nov. 30, 2001, now Pat. No. 6,931,622, which is a continuation-in-part of application No. 09/545,760, filed on Apr. 10, 2000, now Pat. No. 6,615,198.

(51) Int. Cl.
*G06F 9/45* (2006.01)

(52) U.S. Cl. .......................... 717/153; 706/45
(58) Field of Classification Search ................ 717/153; 706/45
See application file for complete search history.

(56) References Cited

U.S. PATENT DOCUMENTS

| | | | |
|---|---|---|---|
| 4,656,603 A | 4/1987 | Dunn | |
| 5,047,947 A * | 9/1991 | Stump | .................... 700/106 |
| 5,159,687 A | 10/1992 | Richburg | |
| 5,204,939 A | 4/1993 | Yamazaki et al. | |
| 5,295,222 A | 3/1994 | Wadhwa et al. | |
| 5,412,576 A | 5/1995 | Hansen | |
| 5,450,545 A | 9/1995 | Martin et al. | |
| 5,546,507 A | 8/1996 | Staub | |
| 5,574,828 A | 11/1996 | Hayward et al. | |
| 5,634,021 A | 5/1997 | Rosenberg et al. | |
| 5,640,567 A | 6/1997 | Phipps | |

(Continued)

*Primary Examiner*—John Chavis

(57) ABSTRACT

A system and method for generating a performance tool includes a builder, a seeker, and a catalyst. The builder is used to generate the seeker. The seeker is selected for operation, thereby launching the catalyst. The catalyst runs the seeker and receives assertions, such as selected answers, in response to interrogatives, such as questions. When all assertions are provided to all interrogatives, the seeker generates a yield. However, the yield also can be generated dynamically as the seeker operates.

87 Claims, 15 Drawing Sheets

U.S. PATENT DOCUMENTS

| | | |
|---|---|---|
| 5,701,400 A | 12/1997 | Amado |
| 5,999,948 A | 12/1999 | Nelson et al. |
| 6,029,258 A | 2/2000 | Ahmad |
| 6,053,951 A | 4/2000 | McDonald et al. |
| 6,064,982 A | 5/2000 | Puri |
| 6,070,149 A | 5/2000 | Tavor et al. |
| 6,081,263 A | 6/2000 | LeGall et al. |
| 6,117,187 A | 9/2000 | Staelin |
| 6,141,724 A | 10/2000 | Butler et al. |
| 6,163,878 A | 12/2000 | Kohl |
| 6,170,081 B1 | 1/2001 | Fontana |
| 6,192,518 B1 | 2/2001 | Neal |
| 6,201,948 B1 | 3/2001 | Cook et al. |
| 6,226,656 B1 | 5/2001 | Zawadzki et al. |
| 6,230,309 B1 | 5/2001 | Turner et al. |
| 6,230,318 B1 | 5/2001 | Halstead et al. |

\* cited by examiner

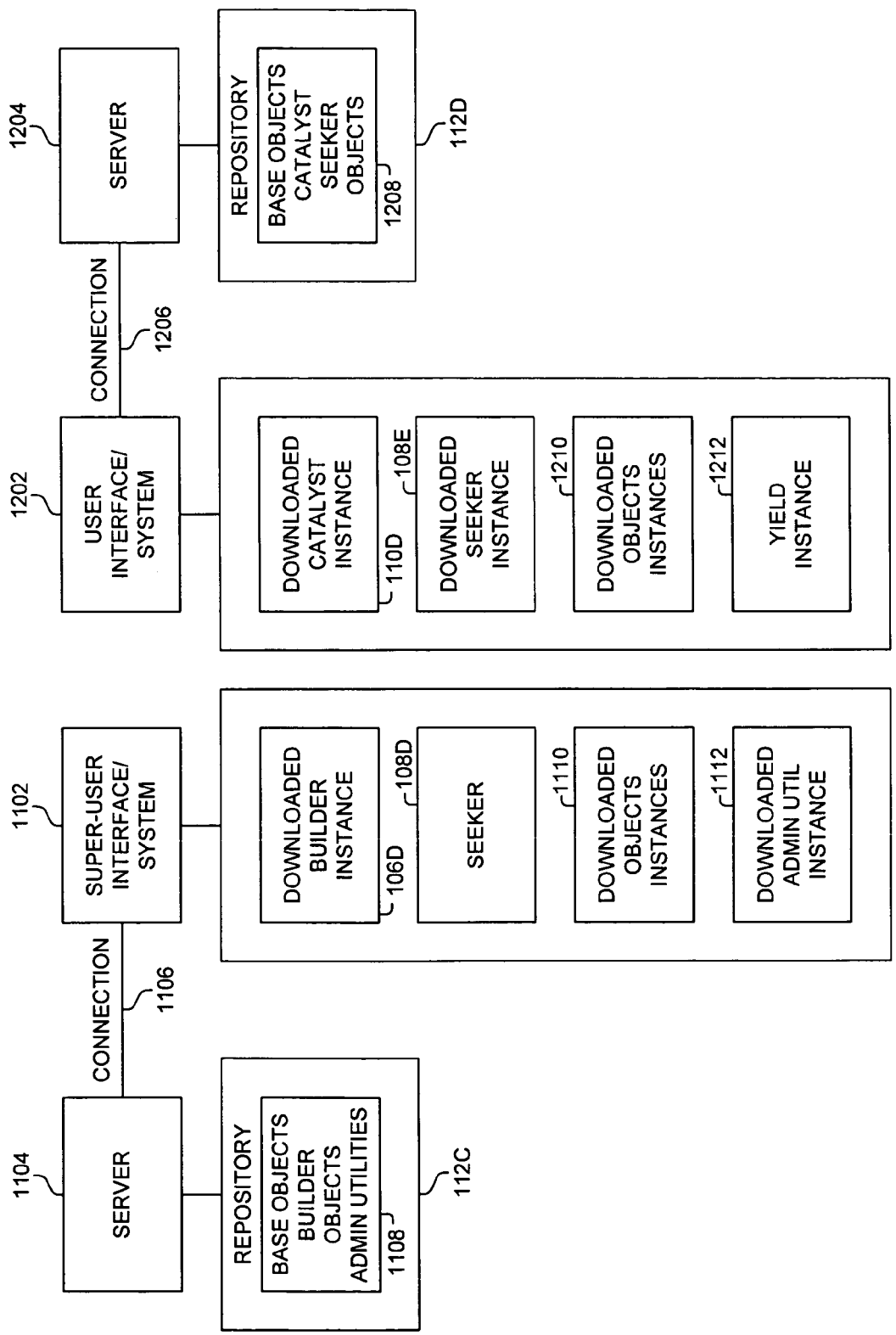

US 7,444,627 B2

SYSTEM AND METHOD FOR CREATING A PERFORMANCE TOOL AND A PERFORMANCE TOOL YIELD

RELATED APPLICATIONS

The present application is a continuation of U.S. patent application Ser. No. 10/017,895, filed Nov. 30, 2001, now U.S. Pat. No. 6,931,622, and entitled System and Method for Creating a Performance Tool and a Performance Tool Yield, which is a continuation-in-part of U.S. patent application Ser. No. 09/545,760, filed Apr. 10, 2000, now U.S. Pat. No. 6,615,198, and entitled System and Method for Creating Performance Solution Tools and Performance Solutions.

FEDERALLY SPONSORED RESEARCH OR DEVELOPMENT

Not Applicable

MICROFICHE APPENDIX

Not Applicable

FIELD OF THE INVENTION

The present invention relates to the field of generating performance tools known as seekers with a computer implemented seeker builder and operated by a seeker catalyst.

BACKGROUND OF THE INVENTION

Computer programs and processes are created for performance analysis and for creating solutions for building systems and performing processes. Many of these systems and processes are complex, and creating the programs to perform the analysis and to create the solution takes a significant amount of time. In addition, when the process or system is complex, it is difficult to program all of the steps that require performance due to the amount of detail required for the solution. Moreover, because of the significant time required, sometimes months, the process or system required for the solutions may change before the programming is complete. Therefore, an improved builder/seeker system is needed to perform analysis of requirements for a solution and to do so in a more responsive period of time. Additionally, a more advanced form of a builder application is needed to facilitate the capture and modification of instructions and data associated with a seeker and the process to which a seeker is intended to address.

SUMMARY OF THE INVENTION

The present invention is directed to a system for a system for determining requirements for a yield. The system comprising at least one interrogative, at least one potential assertion, and logic associated with a combination of the interrogative and an assertion provided in response to the interrogative and the potential assertion and configured to generate the yield as an absolute solution based on the interrogative, the assertion, and the logic. A builder is configured to build the seeker. A catalyst is configured to operate the seeker and, based on the interrogative and the assertion, to execute the logic to select at least one component for the yield.

The present invention further is directed to a system for determining requirements for a yield. The system comprises a seeker configured with a plurality of interrogatives, a plurality of potential assertions, and a plurality of command strings. At least one potential assertion corresponds to each interrogative. At least one command string corresponds to each combination of an interrogative and a potential assertion. A builder is configured to generate the interrogatives, the potential assertions, and the command strings. The builder further is configured to associate the potential assertions to the interrogatives and to associate the command strings to combinations of the interrogatives and the potential assertions to build the seeker.

Further still, the present invention is directed to a system for determining a yield. The system comprises a seeker configured to generate a plurality of interrogatives and a plurality of potential assertions. At least one potential assertion corresponds to each interrogative. The seeker further is configured with a plurality of command strings, and each command string corresponds to a combination of an interrogative and a selected potential assertion. A catalyst is configured to operate the seeker, to process command strings associated with combinations of the interrogatives and the selected potential assertions, and, in response thereto, to select at least one component for a yield.

Still further, the present invention is directed to a system for determining a seeker. The system comprises an input manager configured to receive an input and to generate a command string corresponding to the input. A builder interpreter is configured to receive the command string, to execute a command method corresponding to the command string, and, in response, to identify a data component for the seeker. A builder collector is configured to store the data component. A process manager is configured to receive the command string from the input manager, to pass the command string to the builder interpreter, to receive the data component from the builder interpreter, and to store the data component in the builder collector.

Also, the present invention is directed to a system for determining a seeker. The system comprises an input manager configured to receive input and to generate a command string corresponding to the input. A command factory is configured to create an instance of a command object having a command in an execute method and to pass the command object for execution. An interpreter is configured to receive the command string, to create the command factory and to pass the command string to the command factory, to receive the command object from the command factory, to execute the execute method, and, thereafter, to identify a data component for the seeker. A collector is configured to store the data component. A process manager is configured to receive the command string from the input manager, to create the interpreter, to pass the command string to the interpreter, to receive the data component from the interpreter, and to store the data component in the collector.

Additionally, the present invention is directed to a system for processing a seeker. The system comprises a flow manager configured to process at least one interrogative to generate the interrogative and to process at least one potential assertion, to receive at least one assertion in response thereto, and, thereafter, to process logic for the interrogative and the assertion to select at least one component having at least one variable to generate a yield. A yield manager is configured to store the component and the variable for the yield.

Further, the present invention is directed to a system for determining requirements for a yield. The system comprises a repository comprising a builder. A server is configured to access the repository to create an instance of the builder and to transmit the builder instance from the server. A super-user system is configured to connect to the server via a connection, to download the builder instance to the super-user system, and to operate the builder instance to generate the seeker.

Further yet, the present invention is directed to a system for determining requirements for a seeker. The system comprises a repository comprising a builder. A server is configured to access the repository to create an instance of the builder and to make the builder instance operational from the server. A super-user system is configured to connect to the server via a connection and to operate the builder instance from the server to generate the seeker.

Still further, the present invention is directed to a system for determining requirements for a yield. The system comprises a repository comprising a seeker and a catalyst and a server configured to access the repository to create an instance of the catalyst and an instance of the seeker and to transmit the seeker instance and the catalyst instance from the server. A user system is configured to connect to the server via a connection, to download the catalyst instance and the seeker instance to the user system, to launch the catalyst instance with the seeker instance from the user system, and to operate the seeker instance to generate the yield.

Additionally, the present invention is directed to a system for determining requirements for a yield. The system comprises a repository comprising a seeker and a catalyst and a server configured to access the repository to create an instance of the catalyst and an instance of the seeker and to make the seeker instance operational with the catalyst instance from the server. A user system is configured to connect to the server via a connection, to launch the catalyst instance with the seeker instance from the server, and to operate the seeker to generate the yield.

Moreover, the present invention is directed to a system for generating a performance tool. The system comprises a process object panel is configured with a plurality of process objects. A repository object panel is configured with a plurality of repository objects. A graphic seeker representation panel is configured to receive a plurality of seeker objects three dimensionally identifying a three dimensional seeker process. Each object is connected to at least one other object. The plurality of seeker objects comprise at least one member of a group comprising at least one process object and at least one repository object.

The present invention also is directed to a system for generating a performance tool. The system comprises a plurality of components each having a component identification and a type. An interrogative is configured with interrogative data. A potential assertion is configured with assertion data selectable in response to the interrogative. A command string set corresponds to a combination of the interrogative and the selected potential assertion that, when processed for execution and executed, is configured to cause selection of at least one of the components for a yield.

Further yet, the present invention is directed to a system for determining requirements for a yield. The system comprises a seeker comprising a plurality of interrogatives and a plurality of potential assertions, a selected one of the plurality of assertions corresponding to each interrogative, and configured to generate the yield as an absolute solution based on the interrogatives and the selected assertions. A builder is configured to build the seeker. A catalyst is configured to operate the seeker to generate the interrogatives and the potential assertions and to receive the selected assertions to generate the yield.

Further still, the present invention is directed to a system for determining requirements for a yield. The system comprises a seeker comprising a plurality of interrogatives and a plurality of potential assertions, a selected one of the plurality of assertions corresponding to each interrogative, and configured to generate the yield as an absolute solution based on the interrogatives and the selected assertions. A catalyst is configured to operate the seeker to generate the interrogatives and the potential assertions and to receive the selected assertions to generate the yield.

BRIEF DESCRIPTION OF THE DRAWINGS

FIG. 11 is a block diagram of a super-user system with downloaded component instances in accordance with an embodiment of the present invention.

FIG. 12 is a block diagram of a user system with downloaded component instances in accordance with an embodiment of the present invention.

DETAILED DESCRIPTION

Figure 1:
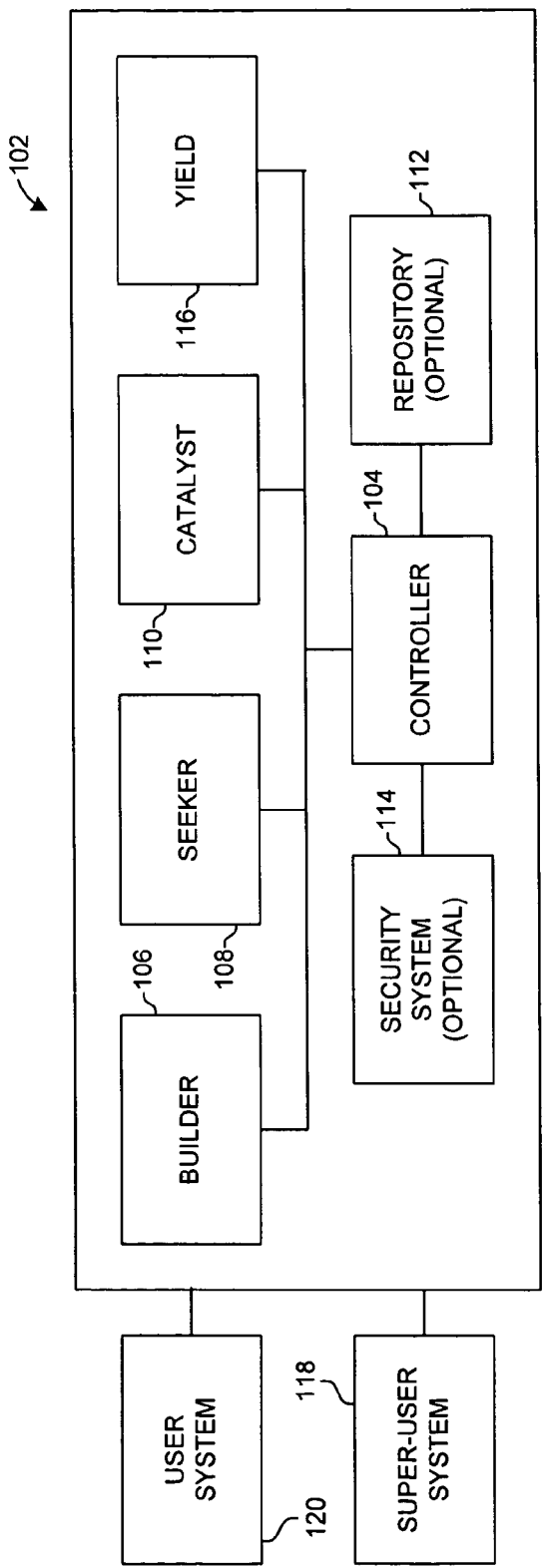
FIG. 1 is a block diagram of a seeker system in accordance with an embodiment of the present invention.

Builder applications may be written using standard technology, such as JAVA Swing, JAVA, C++, and others. However, an advanced builder application is needed that is intended to facilitate the capture and modification of not only instructions and data associated with a seeker, but also the process that the seeker is intended to address. Such processes range from simple to extremely complex. Highly complex processes may involve intensely complicated branching. Such branching often cannot adequately be expressed using conventional two dimensional diagramming techniques. Thus, a three dimensional builder environment would better facilitate 1) apprehension, organization, and display of complex processes; 2) some automated translation from process information to programming code and appropriate data; 3) debugging support; and 4) deployment support, such as the capacity to distribute seeker data to a variety of platforms, including extensible mark-up language (XML), Oracle platforms, DB2, and Microsoft Access.

The builder application can then be used to build seekers. Seekers are tools that enable a user to perform highly complex processes and to build highly complex systems and devices, without requiring the user to first perform costly and lengthy training in one or more areas of technology.

The systems and methods of the present invention enables a user to rapidly build complex performance tools and solutions that support complex decision processes. They dynamically build unique performance tools and solutions based upon user input or automated responses. The user need not be an experienced programmer or experienced in the technical field in which the tool is to be generated. The invention dynamically writes code for a tool based upon user input or automated responses.

When a system of the present invention is operated, a user or automation system can provide responses to interrogatives. The system uses the responses to provide a solution in varied forms and formats, including a report, medium, graphical based data, links to on-line training, generation of additional tools, activation of automated objects, automated population of databases, and/or other forms.

The systems and methods of the present invention may be enabled in multiple interface forms. For example, systems configured according to the present invention may interface with personal computer systems, including desktop computers and laptop computers, server computer systems, handheld devices, voice response systems, voice generation systems, voice activated systems, graphical systems, and automated systems that do not require user operation.

Additionally, the present invention may generate information through multiple interfaces. For example, the present invention may generate information to a GUI interface, via voice response, as a data stream, for browser enabled systems, and/or other systems.

The present invention is able to collect information through whatever means is required. For example, in one embodiment, the present invention may collect information through voice activation or a graphical user interface (GUI). In another embodiment, the present invention may collect information through data stream automation or a data stream listener.

A data stream listener, for example, monitors a voice or data stream and applies logic to one or more pieces of data from that stream. In one embodiment, a data stream listener monitors a data stream to identify and match portions of the data stream to a specified pattern. If the data stream listener identifies that pattern in the data stream, the data stream listener initiates an action, automates a process, generates a message, and/or takes another action.

The present invention further may be configured to communicate with varied databases. For example, in one embodiment, the present invention may be configured to open a portal to a structured query language (SQL) database, a DB2database, an Oracle database, and/or another database. In another embodiment, the present invention may be configured to communicate with one of the aforementioned databases or more than one of the aforementioned databases. In other embodiments, the present invention may be configured to communicate with other databases in addition to, or exclusive of, the aforementioned databases.

In some embodiments, the present invention may be configured to automate tasks. A task may be controlled by, and launched through, a smart object or a smart seeker. For example, an e-mail may be automatically launched to a user as part of the implementation of a particular system. In another example, a database may be updated at the end of an implementation of the system.

In some embodiments, the present invention is configured to make decisions or initiate actions based upon pattern matching. With the pattern matching, features are enabled and/or disabled when a pattern is identified. For example, if the pattern in a layer of selected data is determined, a system of the present invention may select options to present for a seeker or to activate a smart object. This pattern matching is advanced over prior systems in which options were enabled or disabled based only on selections made for an immediately prior option.

In some embodiments, the present invention uses object oriented system objects that have unique capabilities. Objects may include text, graphics, data, automation, and/or other attributes. The objects, for example, may be used to build a parts list or to automate a process.

Objects also may include logic and/or processes from other objects. Objects may include modifiers used to further define the object. For example, an object may be defined as a ball. A modifier for large may be added followed by a modifier for red. Thus, the object becomes a large red ball.

Similarly, an object can be defined for a tracking system for a package. An object for a package may be defined with a starting location. A modifier for a first location may be added, followed by a modifier for a second location, followed by a modifier for a third location. A modifier for the destination ultimately may be added. Thus, the object may be defined as a package having a starting point, a first, second, and third location at which the package traveled, and a final destination.

Objects also may be identified as smart objects. A smart object may include a set of properties or smart components that enable the smart object to initiate an action, such as obtaining further information or initiating an automated process. For example, a listener smart object may monitor a data stream, identify a series of bits and/or bytes, and send data with the identified byte stream to another object and/or initiate an automation object, such as automating obtaining data from a selected database and transmitting that data via e-mail to a selected user.

FIG. 1 depicts an exemplary embodiment of a seeker system of the present invention. The seeker system 102 comprises a controller 104. Optionally the seeker system 102 may comprise one or more of a builder 106, a seeker 108, a catalyst 110, a repository 112, a security system 114 and/or a yield 116. A super-user system 118 or a user system 120 may communicate with the seeker system 102. Preferable, the seeker system 102 is developed as an object oriented system. Although, other implementations exist.

The controller 104 operates the components of the seeker system 102. When the seeker system 102 has only a builder 106, the controller 104 operates the builder. The controller 104 may operate the builder 106 to generate one or more seekers, such as the seeker 108. In other instances where the seeker system 102 includes a seeker 108 and a catalyst 110, the controller 104 operates the catalyst so as to run the seeker. Additionally, the controller 104 may control transferring data to and from the repository 112, when included. Further, the controller 104 may operate the security system 114, when included, to control the ability of users to interact with the system.

The controller 104 may be logically or physically divided in some embodiments. For example, the controller 104 may include multiple processors or a single processor.

Further, the controller 104 may be a controller on a server-type system. This may include an intranet server, an internet server, a local area network (LAN), including an ethernet network, a wide area network (WAN), and other networking systems and server enabled systems.

Further, the controller 104 may operate on a standalone basis, such as in a personal computer. Thus, a builder 106, a seeker 108, and/or a catalyst 110 may be downloaded to a computer, such as a personal computer, and operated from the controller 104 on that computer. In this example, the repository 112 may be downloaded to the computer on which the controller 104 resides. Alternately, a link may be established to the repository 112, if required.

The seeker system 102 may be embodied in multiple forms. For example, the seeker system 102 may partially or wholly be included in a networked system, such as an internet system, an intranet system, a LAN, including an ethernet system, a WAN, and other network systems. Additionally, the seeker system 102 may reside wholly or partially on a single computer. For example, one or more components of the seeker system 102 may be loaded or downloaded to a computer, such as a personal computer, and operated from that computer.

The builder 106 is used to create one or more seekers, such as the seeker 108. The builder 106 also may include collectors or containers to hold data and/or objects.

The builder 106 further may be configured to include an interface to enable a user using a user system 120 to input data and to enable a user to identify a seeker that is being constructed and/or builder operations. For example, a builder 106 may include an input manager and an output manager to manage input and output, such as for a GUI or a voice response/voice generation system. In one embodiment, the builder 106 includes a three dimensional (3D) graphical user interface. The 3D interface enables a user to build a seeker by clicking, dropping, and dragging an object to a 3D representation panel and connecting the objects with connectors to depict potential options and/or process flow. The 3D representation enables a user to efficiently depict a process example on a monitor or other output device by providing a system and method used to see and manipulate objects and any supporting objects simultaneously. In other embodiments, the builder 106 may include a voice-based interface, a form-based interface, or other interfaces.

The builder 106 further may be configured with logic to generate command strings. The logic may be used to bind objects and to generate the interrogatives and receive and process assertions and modifiers. The logic may enable a user to create interrogatives and assertions, including modifier objects, to generate a seeker. The logic may be generated for individual objects, including interrogative objects, assertion objects, and modifier objects.

The builder 106 further may be configured with an interpreter to execute the command strings. The executed commands may be used to build interrogatives, assertions, and/or logic for a seeker.

An interrogative provides a decision point. For example, an interrogative may include a question, such as a true or false question, a question with one or more possible assertions, a selection to which a graphic may be a response, or another type of interrogative. An interrogative is a selection directive to which a response is required. An interrogative may be implemented as an interrogative object.

An assertion is a response or potential response or potential response to an interrogative. An assertion may be a selected assertion, such as a selection from a list of four items or a true or false, or entered assertion, such as a text entry from a dialogue box or another entry, a selected or entered graphic, and/or other assertions to interrogatives. Similarly, corresponding potential assertions may include selectable assertions, enterable assertions, selected or enterable graphic assertions, and/or other potential assertions. For example, an interrogative may be generated with a list of four selectable potential assertions (i.e. potential responses). One of the four items may be selected, and the selected item is the selected assertion for that interrogative. An assertion may be implemented as an assertion object that may be selected and defined for a particular interrogative object.

Objects may include interrogative objects, assertion objects, component objects, modifier objects, and other objects. Objects may include data, methods, and/or logic. Objects may be stored in a collector.

Collectors hold objects, including data objects, code bearing objects, and/or a combination of the two. Collectors also hold modifiers and other objects. The collectors facilitate a secondary or external process to produce output.

The seeker 108 receives data and, in response to the data, provides a yield. The yield is an instance of a solution for which the seeker was generated. For example, in a first instance, the yield may identify a parts list that a switch may require so that it may be installed in a network. In another instance, a different parts list may be generated for a yield for a switch that is to be implemented in a different network.

A seeker 108 may contain interrogatives. The interrogatives are generated to a user, and assertions will be collected in response to the interrogatives. Additionally, a seeker 108 may generate automation. For example, a seeker 108 may send itself to a first user, collect information from a first user, send itself to a second user, collect information from the second user, and then provide a yield for which the information was collected. In this example, the seeker 108 may transmit itself to the first and second user via e-mail.

The seeker 108 also may initiate other automated seekers or automated objects. For example, a seeker may activate an automated object that will initiate a connection to a database, collect information from the database, and return the information to the seeker. This connection may be an internet protocol (IP) connection to an internet or intranet location or another connection.

A seeker 108 may be a smart seeker. Smart seekers have artificial intelligence attributes. For example, the smart seeker may be configured to identify trending and to activate an action in response to identifying a trend. For example, the smart seeker may identify three particular assertions to interrogatives and activate another smart seeker that is generated to a user via e-mail for collection of data. In another example, a smart seeker may monitor other seekers used by users and, at a particular level of use, notify a super-user of the use level and increase a system resource, such as processing speed, memory, or bandwidth, allocated to a system on which the seekers operate for those users.

A seeker 108 is a data file containing information required to create an active data object that collects data, including pull down selections and menus, text and graphic objects that are configured to receive and collect text, changeable versions of both data objects and text objects that identify which objects, if any, are to be reactivated to re-collect information, and other objects. An object may re-collect information if an assertion to an interrogative is changed, thereby potentially requiring different selections or assertions for subsequent objects. For example, if a user provided assertions for five interrogatives and subsequently changed an assertion for the third interrogative, then it may be necessary to obtain new assertions for the fourth and/or fifth interrogatives. A changeable version of an object is configured to identify which other interrogatives will be re-activated based upon the changed assertion a prior interrogative.

The seeker 108 may be implemented in a variety of formats. For example, the seeker 108 may be a listener seeker, a voice response seeker, a voice activated seeker, a voice generation seeker, a GUI implemented seeker, an automation seeker, and other types of seekers. Listener seekers, for example, may be configured to monitor data, such as a data stream, and take some action or transaction when a specified match is identified. For example, a data listener seeker may monitor a byte stream and e-mail a user when a pattern of bytes is identified. In another example, a listener seeker may monitor voice data, such as in a voice response activated system or a security system, and take some action upon identifying particular words and/or syllables in the voice data stream.

A voice response seeker may activate an action or transaction based upon receiving and identifying a voice, such as receiving voice commands and initiating another seeker in response to the voice commands. Further, a seeker may be a voice simulation seeker. In this example, a seeker would provide voice commands or responses in response to some action or transaction, such as an assertion to an interrogative.

The seeker 108 may include an interface. For example, the seeker 108 may include a GUI configured to provide data to a user graphically or as text. A voice response seeker may have an interface configured to provide data to a user using voice simulation, a GUI, or a combination of the two. An automation seeker may or may not include an interface, depending on the seeker. For example, an e-mail automation seeker may include a GUI interface presented to a user upon opening the e-mail. However, in another example, a data automation seeker activated to query and collect data from a database may not have a user interface, but may have a database interface. Other examples exist.

A seeker 108 may be configured as an evaluator. An evaluator evaluates a level of prior use or a level of prior response to determine a current proposed level of use or current proposed level to which interrogatives may be posed. Thus, an evaluator identifies past performance to dynamically determine a current level to which a user may be set. An evaluator seeker may be used, for example, in a training exercise to determine a level of expertise for a user and then identify a level at which the user may be placed when providing assertions to interrogatives for a network configuration process. If the user demonstrates expertise in a certain area, interrogatives may not be required for a more basic area, such as a basic network setup. Other examples exist.

The seeker 108 may be generated for a series of layers. A seeker for a basic level may not be required to provide graphics and/or reports. A basic level seeker may be selected to provide only text. A process level seeker may enable or disable solution trees, such as with troubleshooting. A complex process level seeker may be configured to enable graphics and/or reports and provide complex logic. For example, a complex process level seeker may place graphics at identified coordinates and provide links to training or help menus. An automation seeker may provide artificial intelligence attributes, such as by initiating an automation process. A trending level seeker may monitor assertions, identify trends, and take an action or a transaction in response to identifying the trend. It will be appreciated that the higher level seekers include functionality of the lower level seekers. For example, the automation seeker also includes attributes of the complex process level seeker. Similarly, the complex process level seeker includes the attributes of the basic level seeker.

The seeker 108 may contain data relational to one or more object components. Object components include process-related objects, such as decisions, actions, yields, interrogatives, assertions, and data; automation objects, such as e-mail automation objects, database update objects, notification objects, test run objects, chat launch objects, and medium open objects; and logic and/or algorithmic objects.

The catalyst 110 operates a seeker, such as the seeker 108. The catalyst 110 is initialized upon activation of a seeker, whether the seeker is activated automatically or through a user selection.

The catalyst 110 processes the builder programming logic, together with data and objects that support processes for the seeker 108, to generate interrogatives or to initiate and/or complete some automation process. When the catalyst 110 generates interrogatives, the catalyst also may be configured to receive assertions. The catalyst 110 processes the assertions with data and/or objects, including objects having supporting processes, to generate a yield for the seeker. As discussed, the yield is a total solution for the seeker. In the instances in which a seeker is an automation seeker, the catalyst 110 may process the automation seeker without generating interrogatives or other data to a user interface and may provide the yield as an input to another process or seeker, as data to a database or some other location, or as some other output.

The catalyst 110 may collect information through multiple collection methods. The catalyst 110 may collect information via a user interface presented to a user through which a user may enter data. The catalyst 110 further may collect information by generating a connection or a link to a database, an internet or intranet site, a network location, or some other location and by retrieving the data from that location. The catalyst 110 may generate queries via the link or connection and receive data in response to the query. The catalyst 110 may use the response data to further operate the seeker 108, such as using the data to determine a next sequence of interrogatives or a next process. The catalyst 110 also may store the data or use the data for some other process or purpose.

The catalyst 110 may use other collection methods. For example, the catalyst 110 may operate a seeker that is listening to streaming data or voice. In this example, the catalyst 110 and the seeker may collect bytes of data, voice samples, or some other data.

The seeker 108 may be operated through an interface that provides interrogatives to a user. For example, the seeker 108 data file, when activated in catalyst 110, may generate a user interface that queries a user for necessary scenario-based information. Moreover, a seeker 108 may operate in different formats, languages, and methods of collection simultaneously using the same source objects that were associated in the builder 106 to create the seeker 108. The seeker 108 may be configured to generate one or more user interfaces having one or more different formats, including different language formats and/or different types of user interfaces, such as a GUI or a voice simulated or voice response interface.

The repository 112 stores data and objects for temporary, semi-permanent, and/or permanent use. The repository 112 may be virtual or a physical device, and it may be logically parsed into one or more configurations. The repository 112 may be accessed as necessary, including a server based configuration, such as a web enabled configuration, and a downloadable configuration. For example, the controller 104 may open a portal to the repository 112 and move an instance of one or more objects to the controller for processing. Alternately, the controller 104 may open a portal to the repository 112, and an instance of one or more objects may be processed from the repository. In another example, objects may be downloaded from the repository 112 to a standalone computer, such as a personal computer. In such a configuration, the controller 104 may initiate a portal to the repository 112 and control the download to the computer. Alternately, the computer may initiate a portal directly to the repository 112 or via the controller 104 to the repository.

The security system 114 governs access for a user or a super-user to the seeker system 102. The security system 114 may provide access to a builder 106 or a seeker 108 based upon access rights identified for a user or a super-user. For example, a password for a user or a super-user may identify the level of access or use for that user or super-user. Preferably, the security system 114 will process an identification and/or a password to identify and to provide the level of access and/or use to a user or super-user.

The yield 116 is the absolute solution generated by the seeker 108 when operated by the catalyst 110. Because the yield 116 is based on the dynamic collection of assertions and/or data from the seeker 108, the yield is a dynamic and accurate solution for an instance of a seeker. Thus, the yield 116 is generated dynamically as assertions are selected for interrogatives. Moreover, a user or super-user using a super-user system 118 may view or otherwise identify, such as through a voice system, the dynamic yield 116, assertions, and components selected in response to assertions dynamically as they are created. Therefore, a user or super-user can view or otherwise identify the yield as it is being constructed or processed.

Each instance of a seeker may result in a different instance of a yield 116. The yield 116 may identify a component, a system, and/or a process. Alternately, the yield may be data, an object, a system, a process, and/or another function. In addition, the yield 116 may be an automation, such as an automatically generated e-mail, a smart seeker or a smart object, an automated system, an automated process, or another automated yield. Other examples of other yields exist.

The super-user system 118 is a processor-based system that enables a super-user to communicate with the seeker system 102. The super-user system 118 may be a personal computer, a networked computer, or some other processor-based system. The super-user system 118 enables a user to send and receive data, including commands, logic, objects, user interfaces, and other data, to and from the seeker system 102.

The user system 120 is a processor-based system that enables a user to communicate with the seeker system 102. The user system 120 may be a personal computer, a networked computer, or some other processor-based system. The user system 120 enables a user to send and receive data, including commands, logic, objects, user interfaces, and other data, to and from the seeker system 102.

The seeker system 102 of FIG. 1 operates as follows. In a first example, a super-user connects to the seeker system 102. In this example, the seeker system 102 includes a controller 104, a builder 106, and a repository 112. The builder 106 is operated by the controller 104 and may store data and/or objects at the repository 112 as needed and/or retrieve data and/or objects from the repository as needed.

The super-user uses the builder 106 to create the seeker 108. In this example, the super-user produces a list of interrogatives with possible assertions for each so that the interrogatives, when generated to a user, each are associated with a pull down menu that can be generated to a user interface. The builder 106 uses the builder programming language code (BPLC) to create the interrogatives, to create and associate assertions with interrogatives, to designate how the interrogatives will be presented, and, to designate how one or more next interrogatives and assertions will be presented to the user, based on selected assertions. In this example, the builder 106 has an interface through which the super-user can generate the BPLC. The builder 106 further uses the BPLC to generate the logic with which each interrogative and assertion will be processed for generation to a user and, based upon the assertions provided by a user, what the yield will be.

While operating, the builder 106 uses objects and data stored in the repository 112. For example, an automated object or other repository object may be needed for a process or a data stream listener object may be needed by the builder and obtained from the repository. Other objects and/or data may be needed by the builder 106 while operating and may be obtained via the repository 112. Additionally, the builder 106 may store data in the controller 104 or the repository 112 for temporary, semi-permanent, and/or permanent use.

In another example, the seeker system 102 includes a controller 104, a seeker 108, a catalyst 110, and a repository 112. A user connects to the seeker system 102 via an IP connection. In this example, the IP connection is an intranet connection. The user selects the seeker 108, which launches the catalyst 110. The catalyst 110 operates the seeker 108 and is controlled by the controller 104.

In this example, the seeker 108 generates a user interface for the user. Through the user interface, the seeker 108 presents a series of interrogatives. The user responds to the interrogatives with assertions. The seeker 108 is configured to select from among a series of interrogatives based upon assertions presented in response to a prior interrogative. Thus, for example, if a user responds to an interrogative by presenting a first assertion, the seeker 108 will then generate interrogative D to the user. Whereas, if the user presents a second assertion in response to an interrogative, the seeker 108 will generate interrogative G to the user via the user interface. Each assertion to each interrogative initiates a similar response by the seeker 108 to provide additional and/or final interrogatives so that a yield may be determined. In other examples, the seeker 108 may be configured to step through a sequence of interrogatives, regardless of the assertions presented in response to the interrogatives.

After the seeker 108 has presented the final interrogative to the user, and the user has responded with the final assertion, the seeker generates the yield. In some instances, the seeker 108 presents the yield to the user via the user interface. Although, the yield may be used for other purposes. For example, if the yield of the seeker 108 is a parts list, the seeker may be configured to generate the parts list via the user interface, e-mail the parts list to an e-mail address, generate the parts list to another seeker, store the parts list in a database or other device, and/or take some other action.

While operating, the seeker 108 uses objects and data stored in the repository 112. For example, a graphic may be needed for a user interface or a data stream listener object may be needed by the seeker and obtained from the repository. Other objects and/or data may be needed by the seeker 108 while operating and may be obtained via the repository 112. Additionally, the seeker 108 may store data in the controller 104 or the repository 112 for temporary, semi-permanent, and/or permanent use.

Figure 2:
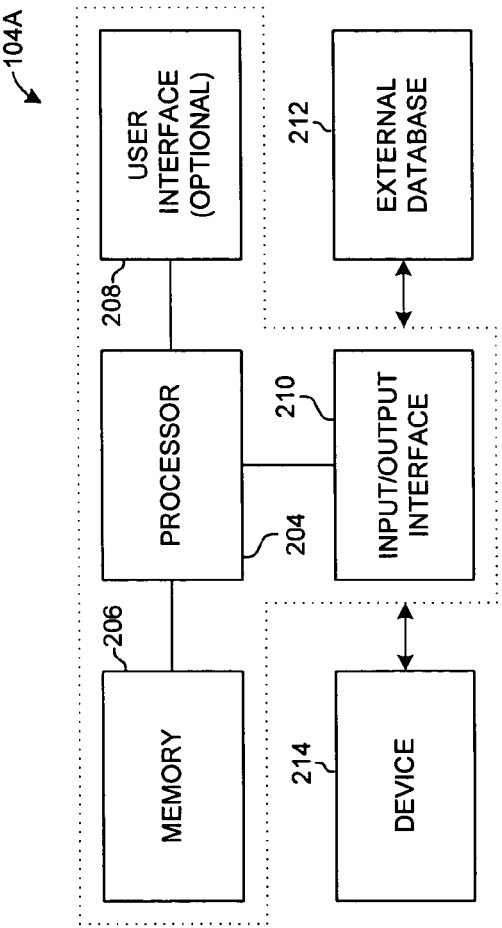
FIG. 2 is a block diagram of an exemplary controller in accordance with an embodiment of the present invention.

FIG. 2 depicts an exemplary embodiment of a controller that may be used with the present invention. The controller 104A of FIG. 2 comprises a processor 204, a memory 206, a user interface 208, and an input/output interface 210. The controller 104A may communicate with a database 212 and/or a device 214. Other examples of controllers exist.

The processor 204 processes software and/or firmware to carry out operations for the controller 104A, including processing builder programming language code and catalyst programming language code. The processor 204 may be configured to process data and command strings or execute methods of objects to effect processes for a builder 106 or a catalyst 110. Execute methods of objects, including command objects, sometimes may be referred to as command methods.

The processor 204 may be configured to control transmitting data, including messages, to and from the controller 104A via the input/output (I/O) interface 210. The processor 204 also may be configured to control generating information to the user interface 208 and receiving information from the user interface. The processor 204 further may control transmitting data to the memory 206 for temporary, semi-permanent, and/or permanent storage and retrieving data from memory.

The memory 206 is configured to store data used by the processor 204 during operation and to provide access for that data to the processor. The memory 206 is configured to store data for temporary, semi-permanent, and/or permanent storage. Thus, the memory 206 may include volatile memory and/or non-volatile memory. Examples of such memory are random access memory (RAM), non-volatile RAM (NVRAM), read only memory (ROM), including programmable read only memory (PROM), erasable programmable read only memory (EPROM), and/or electrically erasable programmable read only memory (EEPROM). The memory 206 also may include flash memory or scratch memory.

The user interface 208 is configured to generate data for manifestation to a user system and/or receive data from a user system. For example, the user interface 208 may include a GUI, a web enabled interface, a voice activated interface, a voice recognition interface, a voice simulated generation interface, a keyboard, a mouse, and other input and output devices. A GUI or web enabled interface may include interfaces generated to monitors for personal computers and other computers and interfaces generated for hand held devices, such as a palm pilot, a wireless phone, or another hand held unit. It will be appreciated that an interface may include one or more of the interfaces identified above or other interfaces. For example, an interface may include a voice activated/voice recognition interface and a voice generation interface.

Generating data for manifestation of a GUI interface may include generating data for display on a monitor, a hand held device, or another GUI interface. The user interface 208 also may include a video interface or an audio interface, such as an MP3 interface. Generating data for manifestation of an audio interface, such as a voice generation interface, may include generating data for voice simulation or other voice generation. Generating data for manifestation of a video interface may include generating data for video display. Other examples exist.

The I/O interface 210 communicates with the database 212 and other devices for which communication is required, such as the device 214, to effect generating a seeker 108 by a builder 106 or to effect processing a seeker by a catalyst 110. When communicating with the database 212, the I/O interface 210 opens a connection to the database. The I/O interface 210 may push or pull data to or from the database 212 or transmit or receive other data, including messages, to the device 214. The I/O interface 210 may be configured to communicate with any database, including an SQL database, a DB2 database, via XML, an Oracle database, and others.

The I/O interface 210 may be configured to communicate using wireless and wireline communications. For example, the I/O interface 210 may be configured to communicate with the database 212 or the device 214 via a LAN, a WAN, a radio frequency (RF), a digital wireless network, a fiber link, a digital service level link, via an IP connection, and other modes.

The database 212 is configured to store data. The database 212 may be, for example, an SQL database, an Oracle database, a DB2 database, and other database types.

The device 214 is a device configured to communicate with the controller 104A. The device 214 may be, for example, a personal computer, a server, a wireless based communication device, an IP device, a router, or another type of device configured to communicate with the controller 104A.

Figure 3:
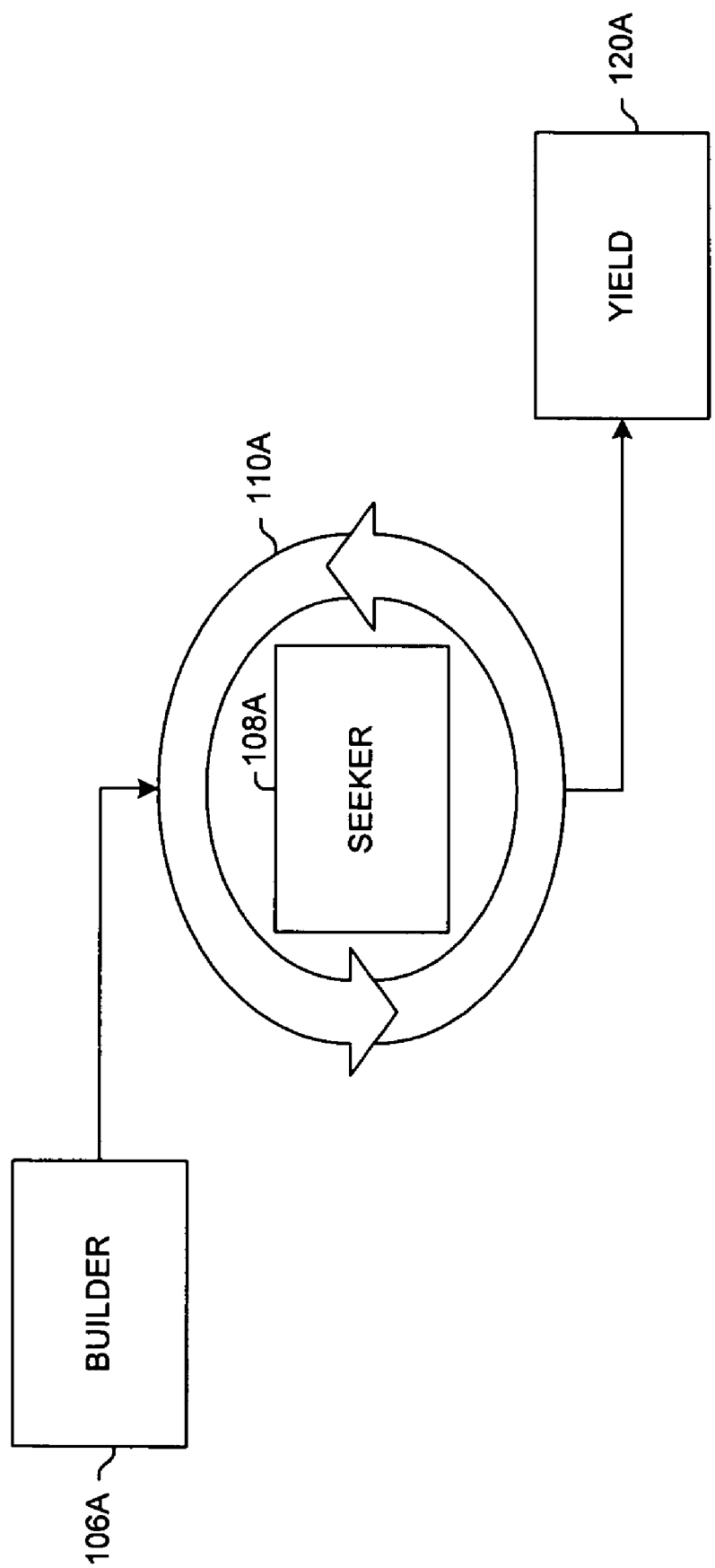
FIG. 3 is a block diagram of a seeker system operating in accordance with an embodiment of the present invention.

FIG. 3 depicts an exemplary embodiment of an instance of the seeker system 102A. In the instance of FIG. 3, an instance of a builder 106A is used to build a seeker 108A. The seeker 108A is selected for operation, thereby launching the catalyst 11A. In other embodiments, the catalyst 110A may be launched and may be used to select a seeker for operation. The catalyst 110A processes the seeker 108A to collect data and/or assertions. The catalyst 110A processes the final data and/or assertions with logic from the seeker 108A to generate the yield 116A.

Figure 4:
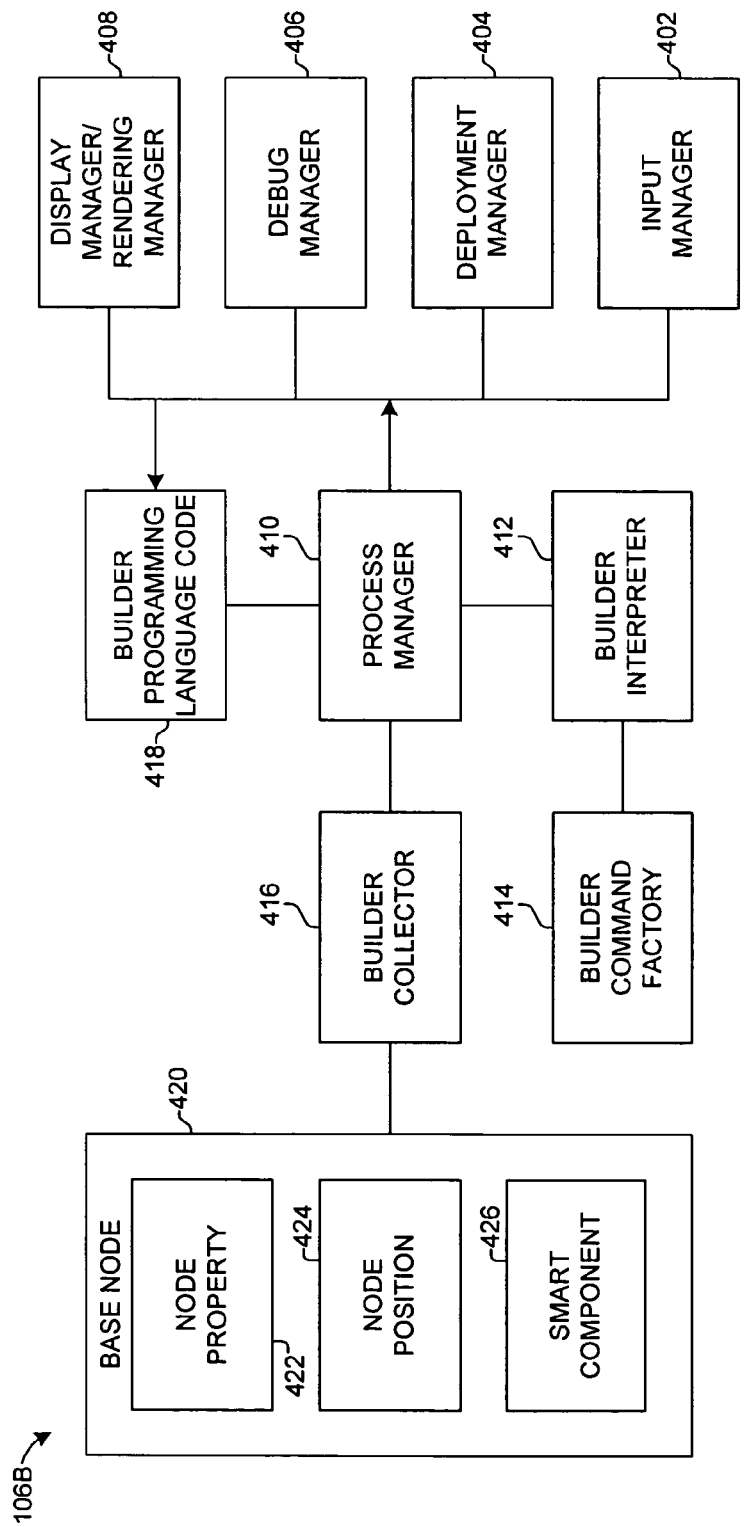
FIG. 4 is a block diagram of a builder system in accordance with an embodiment of the present invention.

FIG. 4 depicts an exemplary embodiment of a builder. The builder 106B of FIG. 4 comprises an input manager 402, a deployment manager 404, a debug manager 406, a rendering manager, such as a display manager 408, a process manager 410, a builder interpreter 412, a builder command factory 414, and a builder collector 416. Preferably the components of the builder 106B are implemented as objects in an object-oriented system.

The input manager 402 captures information entered by a user and creates command strings based on the information entered by the user, including voice entry, text entry, selection of a position of an input device, such as a pointer, selection of a corresponding location of a cursor based on an input from a keyboard, a voice command, or other information. The command strings may be referred to alternately as builder programming language code 418.

In one embodiment, command strings are generated based on a selected command button on a user interface, voice commands, subsequent entries provided by a user in response to a dialogue box, a voice prompt, or another prompt, location selections made by locating a pointer on a monitor or other location selection medium and clicking or otherwise selecting a specific location. Alternately, a location may be selected by generating a set of coordinates using a keypad, a keyboard, a voice command, or another location selection medium. Thus, a location selection medium may be a device or combination of devices that enable selection of a location at which a graphic, text, an object, or another input/output appliance is placed. Examples of command buttons include create decision, create pipe, create process, create output, set, if, endif, and, then. Other examples exist.

Preferably, each of the command strings generated in response to selection of a command and other entries are used to create an object or set a property for an object. For example, a Create Decision command button may be used to create a decision object. The Create Pipe command is used to create an object that connects two or more other objects. The Create Process command is used to create an object that identifies a process. The Create Output command is used to create an output object that generates some output to a screen, paper, a disk, a seeker, or another output. The Create Smart Component command is used to create a smart component object used to generate objects to a screen or to another output device. The Set command is used to set a property for a created object. The if, and, endif, and, then, and, equal (=), and similar commands or text entries are used in the creation of specific command strings for the creation or setting of the above referenced command strings or objects. Once created, the decision object, pipe object, process object, output object, smart component object, and other similar objects may be referred to as nodes.

A command string typically has a command, a name and/or a property, an operator, and an argument. For example, a user may select a create decision command. The user then may be prompted to enter the name of the decision node and a position at which a graphic for the decision node may be placed. The user may enter the word "Color" for the name of the decision node, place a pointer on a monitor, and then select a location on the monitor by clicking a selection button, such as a mouse click. The input manager 402 will associate the name Color for the particular decision node to be created, calculates the virtual position of the location on the monitor at which the pointer selected, and create a command string, such as the following: Create Decision Color @104:404:0. In this example, the decision node that was created is named Color, and the preliminary position of the object Color when generated for display on a monitor will be 104 on the X axis, 404 on the Y axis, and 0 on the Z axis. In this example, the command is Create Decision, the name is Color, the operator is @, and the argument is 104:404:0.

The input manager 402 transmits the command strings to the process manager 410. In some instances, the input manager 402 may receive a command string from the process manager 410 for execution. Typically, a command string received by the input manager 402 from the process manager 410 will include an instruction to obtain information from a user.

The input manager 402 is configured to obtain data associated with each command to be generated when a command is selected. Thus, when a command is selected, such as with a command button, the input manager 402 obtains a name, a property, an operator, an argument, or other command string data required to complete a command string. For each selectable command, the input manager 402 is configured with the required command string data and the mode in which the command string data may be obtained. For example, the input manager 402 may be configured to generate a dialogue box or another prompt or read data provided by another input/output device, such as to read a virtual location of a pointer when a location on a monitor is selected. Alternately, the input manager 402 may be configured to obtain command string data from another location, such as a repository.

Each command string has command string fields that can be populated with command string data. In one example, the command string fields include a command, a name, a property, an operator, and an argument. In this example, the command is generated upon selection of a command button that is selected from a display. The other command string data used to populate the command string fields may be collected by the input manager 402 using varied methods, depending on the command fields and the selected command. For example, the input manager 402 may generate a dialogue box, a voice prompt, or another prompt from which a user may input data. Additionally, the input manager 402 may collect command string data by reading a virtual position on a display at which a pointer was placed and a selection was made, such as by placing a pointer or cursor at the position on a monitor and clicking a mouse button or another pointer selection device. Further, the input manager 402 may collect command string data from a repository, an external database, or another seeker.

The deployment manager 404 distributes data and objects to a location for use by a user. Preferably, the deployment manager 404 has one or more tables that identify the location at which the data and/or objects for a seeker are to be deployed. The tables in the deployment manager 404 may be configurable, loaded from another location, and/or dynamically populated from an object or a smart seeker. Preferably, the deployment manager 404 copies files or data and/or objects to the deployment location, such as to directories on a server or to directories on a local computer.

The debug manager 406 causes command strings and executed commands to be generated to an output device, such as a system console, a monitor, a printer, a disk, or another output device. The debug manager 406 also generates representative output for display. While in debug mode, commands are executed in the builder interpreter 412 using the "debug" method instead of using the "execute" method. The debug method causes data streams to be generated to a selected output device as the commands are executed. The data stream identifies the executed commands and their output.

The debug manager 406 has a "debug on" mode and a "debug off" mode. The debug manager 406 is configured to send the "debug on" command or the "debug off" command to the process manager 410 depending on which command is selected by a user.

A rendering manager is configured to render data and/or objects (i.e. data components) for an output. Rendering may include rendering using a display interface, rendering using an audio interface, or rendering using another type of interface. Thus, a rendering manager may generate a data component, a dialogue box, or other data for display or generate a simulated voice for an audio interface to identify a data component, an audio entry, or other data to be generated using a voice system. It will be appreciated that other output rendering managers may be present in other embodiments, such as a voice manager managing rendering voice output. In the embodiment of FIG. 4, the rendering manager is a display manager 408.

The display manager 408 is configured to generate for display data and/or objects. The display manger 408 may be configured to generate for display data and/or objects for a browser or another display interface, such as a browser window operating from a personal computer or a server.

The process manager 410 is the controlling agent of the builder 106A. The process manager 410 receives command strings from the input manager 402, the deployment manager 404, the debug manager 406, and the display manager 408 (collectively, the manager components 402-408). In response to receiving a command string, the process manager 410 reads a base interpreter object from memory and creates one or more instances of the builder interpreter 412. The process manager 410 then transmits on or more command strings to each of the one or more instances of the builder interpreter 412. The process manager 410 can create one builder interpreter instance and pass all command strings to the builder interpreter instance, create multiple builder interpreter instances and pass one command string to each instance, or create multiple builder interpreter instances and pass one or more command strings to each builder interpreter instance. Additionally, the process manager 410 receives command strings from the builder interpreter 412, determines which of the manager components 402-408 that each command string is to be sent, and transmits that command string to the determined manager component.

The builder interpreter 412 receives command strings, reads the command strings, and executes associated commands, such as command objects or execute methods of objects. The builder interpreter 412 creates a builder command factory 414, when needed, to create command objects and other objects based on command strings received from the process manager 410. The builder interpreter 412 determines when and whether one or more command factories are to be created and which command strings are to be passed to one or more command factories. However, the function and operation of the command factory 414 may be included with the builder interpreter 412 without having the separate command factory. The builder interpreter 414 also may be configured to store components in the builder collector 416 (via the process manager) or to retrieve components from the builder collector, to set variables of the components, and to perform other processes when executing commands.

In some embodiments, the builder interpreter 412 is created to process a command string and execute associated command objects. The builder interpreter 412 thereafter collapses itself. In other embodiments, more than one builder interpreter 412 is created, each for one or more command strings. Other embodiments may include a persistent interpreter or more than one persistent interpreters, whether object oriented or in some other form.

The builder command factory 414 receives one or more command strings and creates executable commands. Preferably, the builder command factory 414 creates command objects having execute methods. In one example, the builder command factory 414 is configured to read a command string, retrieve from memory a base command object corresponding to the command, create an instance of that base command object for the command in the command string with one or more execute methods, and pass the one or more command objects to the builder interpreter 412.

The execute methods may be based on the name, type, operator, and argument in the command string. Alternately, the execute methods may include base methods and/or commands from the base command object. Depending on the specific base command object, the execute method may perform a different process. For example, the builder command factory 414 may have a command create object and a command set object. In this example, the execute method of the command create object, when run, will create a specific instance of an object, and the execute method of the command set object will set a property of a specific instance of an object.

The builder command factory 414 may be configured to identify the command object and the parameters associated with the command object instance to be created by the command string received from the builder interpreter 412. The builder command factory 414 may be configured to read the first word of the command string to identify the command. The balance of the command string preferably identifies the instance command object to be created. In one embodiment, the second word in the command string identifies the node object for which the immediate command object instance will be created. For example, a node object may include a decision node, a process node, a pipe node, an output node, or a smart object node. Preferably, the name of the node follows the node identification, and the argument follows an operator.

For example, a command string may be Create Decision Color @104:404:0. In this example, Create identifies the base command object of command create. Decision identifies the CommandCreate object having a type of decision node. Color identifies the name of the decision node to be created. 104:404:0 identifies the argument of a property of the Color decision node, which in this case is the location property. Other examples exist.

The builder command factory 414 then creates an instance of the command object for population or execution. An instance of the command object will contain the methods and/or data of the base command object. When the instance of that base command object is run, the instance of the command object will execute behavior that is associated with that command.

In some embodiments, the builder command factory 414 is created to create an instance of an object for a command string, and the command factory thereafter collapses itself. In other embodiments, more than one builder command factory is created, each for one or more command strings. Still other embodiments may include a persistent command factory or more than one persistent command factories, whether object oriented or some other form.

The builder collector 416 holds data and/or objects, such as graphic objects, that are created by commands and/or objects executed by the builder interpreter 412. Once an object or data is created, the process manager 410 may store the object or data in the builder collector 416. The object may be retrieved, modified, and again stored in the builder collector 416. Thus, the builder collector 416 is configured to store objects on a temporary, semi-permanent, and/or permanent basis. Further, the builder collector 416 stores the objects from the point at which they are created by the builder interpreter 412 to the point at which they are generated for display by the display manager 408. The objects stored by the builder collector 416 include instances of the base node objects, including instances of a decision node, a process node, a pipe node, an output node, and a smart component node. The data and/or objects may be referred to alternately as data components or data objects.

The builder programming language code 418 includes the command strings described above that are sent between the manager components 402-408 and the process manager 410. The command strings are processed by the process manager 410, the interpreter 412, and/or the builder command factory 414.

A base node 420 is a base object having a type, one or more properties, and one or more methods that can be used to create a seeker. For example, a base node 420 may include a type, e.g. instance, of a decision node, a process node, a pipe node, an output node, and a smart component node. Each type of base node 420 may have a different set of methods and/or data to accomplish different results. For example, a decision node may be used to generate interrogatives for which one or more assertions ultimately may be provided or selected. A process node may be used to generate text or hold a process that may be executed. A pipe node may be used to connect two or more other objects and to identify a connection, such as a communication link identifying line speed and cost. An output node may be used to identify an output type and a destination type, such as an output report having a destination of a printer, an e-mail address, or a seeker. One or more instances of a base node 420 may be generated by the builder interpreter 412 and stored in the builder collector 416.

Preferably, each base node 420 includes a node property 422, a node position 424, and/or a smart component 426, including any combination thereof. An instance of a base node 420 may include one or more instances of the node property 422, a node position 424, and/or a smart component 426.

The node property 422 includes one or more properties for the instance of the base node. Each property may have an argument. For example, an instance of a decision node may include a node property for a question and another node property for an option. The argument of the question property may be the actual question to be presented to a user. The argument of the options property may be selectable options or enterable options to be presented or selected in response to the question.

The node property 422 includes information that differentiates the instance of the base node 420 from other nodes and information that is uniquely appropriate to that particular node. For example, the base node 420 may contain an instance of a node property object 422, containing assigned attributes, including name, color, and shape. In this example, the name attribute will have an argument identifying the name of the node. The color attribute will have an argument identifying the color of the object to be rendered. The shape attribute will have an argument identifying the shape of the object to be rendered.

The node position 424 contains data identifying the position of the instance of the base node 420. The positioning information specifies where an object or an element of an object is located on an output device and/or in relation to other objects. The position information may be provided to the instance of the base node 420 by direct entry, by populating the position information from a repository, by filling the position information from another source, such as when defining that instance of that base node 420, and by other entry or populating means.

A smart component 426 contains instance data and instance behavior. The smart component 426 behavior also may contain methods for the instance of the base node 420. For example, a smart component 426 may contain behavior identifying how to render an object, including how to generate for display a specified shape, how to generate a connection for the shape, and how to share information with other objects. The smart component 426 further may include specific execute method tables and fields that facilitate behavior, methods, and data sharing with other objects.

Figure 5A:
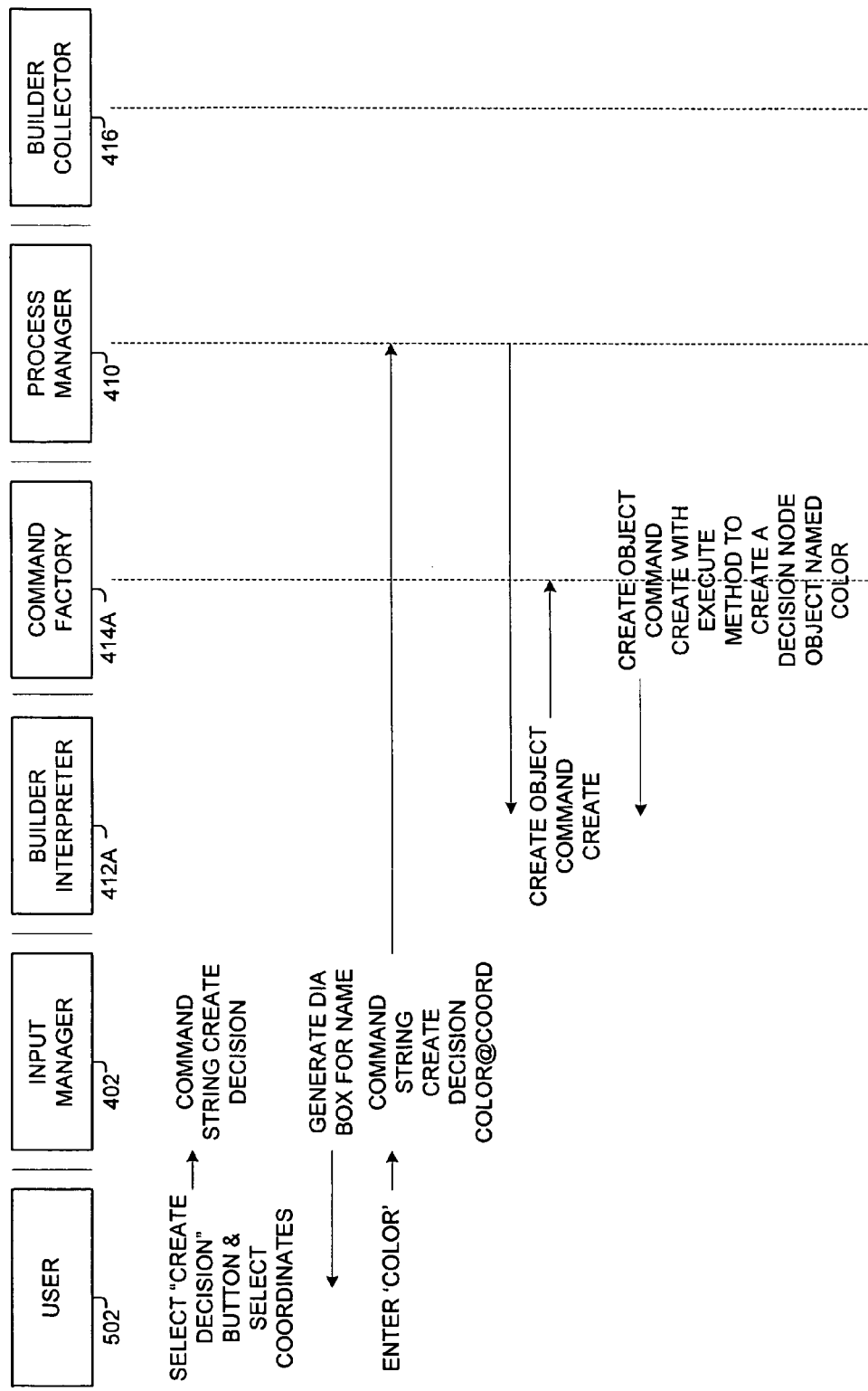
FIG. 5A is a message diagram of builder operations system in accordance with an embodiment of the present invention.
Figure 5B:
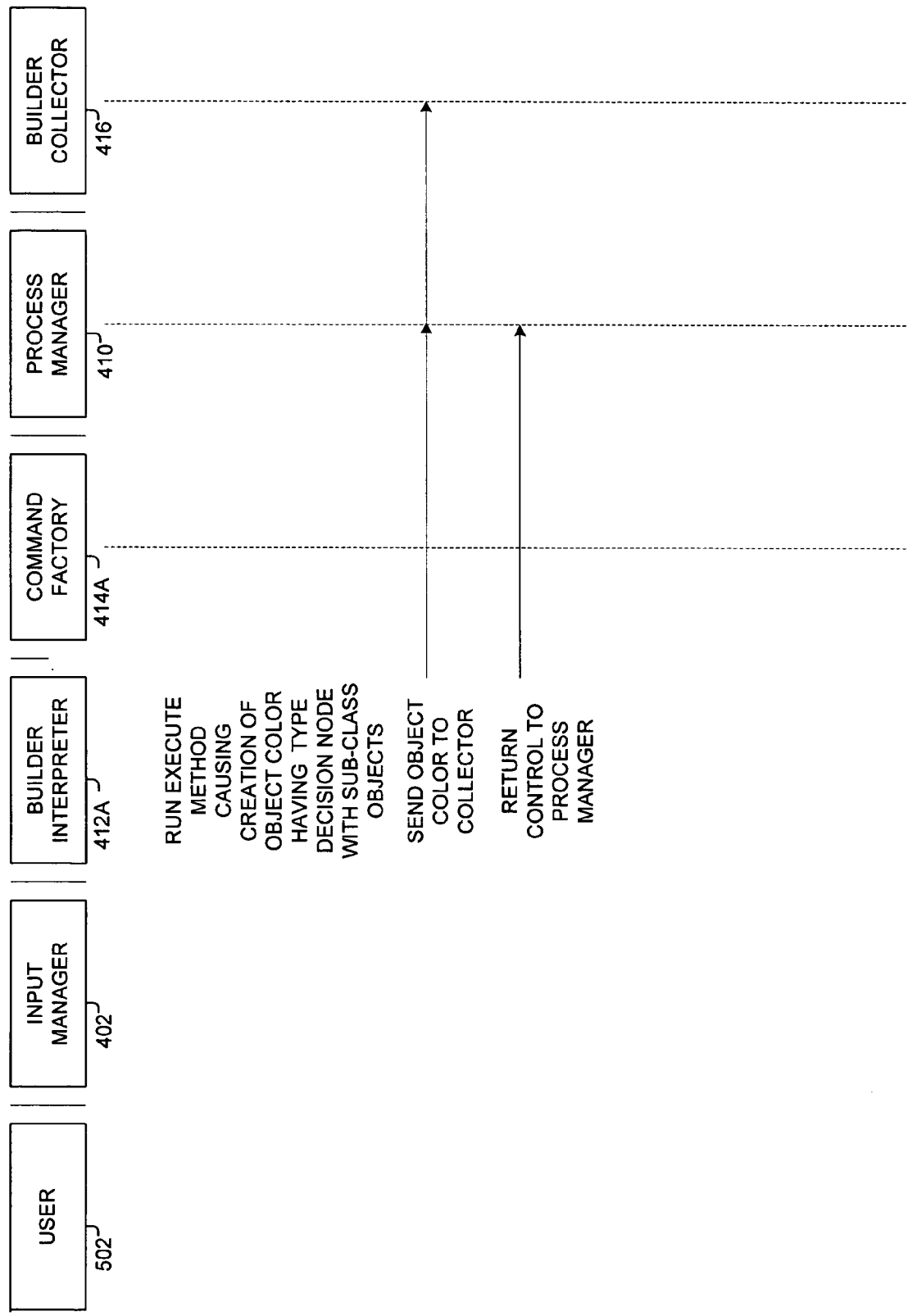
FIG. 5B is a continuation of the diagram of FIG. 5A.

The system of FIG. 4 operates as follows. With reference to FIG. 4 and FIGS. 5A-5F, in a first example the builder 106B is used to create and set a base object called Color having a decision node type. Referring to FIGS. 5A-5B, a user 502 selects a "create decision" button. The user 502 then may select a location on a screen or other output display at selected coordinates, such as by placing the cursor at a location on the screen and clicking a mouse button.

The input manager 402 recognizes that the "create decision" button and a set of coordinates have been selected. In response, the input manager 402 generates a dialogue box for display on a monitor requesting the name of the decision object to be created. In one embodiment, the input manager 402 calls the display manager 408 directly to generate the dialogue box, such as with a command request. This is done through a method, such as "showDialog( )," and the method is executed through the display manager 408 reference. An example of an entire command may be "outputManager.showDialog( )." Other methods exist for the input manager 402 to generate a dialogue box.

The user then enters the word "Color" to identify the name, of the decision object. The input manager 402 receives the input and generates a command string having the command, the type, the name "Color," the operator, and the argument. In this example, the input manager 402 generates a command string for Create Decision Color @Coordinates. The coordinates may be any selected coordinates, but are represented in FIG. 5A as COORD.

It will be appreciated that in other examples another dialogue box may be generated to obtain coordinates from the user 502 rather than reading the selected coordinates before or after a command button is selected. Additionally, a dialogue box may be generated instructing the user 502 to select a location on the monitor, thereby entering the coordinates. Other examples exist.

The input manager 402 transmits the command string to the process manager 410. In this example, the command string is an argument within a "process manager command." For example, the process manager command may be "ProcessManager.ProcessInput(Argument)" where the argument is the command string. Upon receiving the process manager command with the command string, the process manager 410 creates an instance of the interpreter 412A by executing a standard command code. The command code may be, for example, "Binterpreter bInterpreter=NewBInterpreter( )". Executing this command code causes the process manager 410 to read a class interpreter object from memory, and to create the specific instance of the interpreter 412A for interpreting the current command string.

The process manager 410 passes the command string to the interpreter 412A, which causes the interpreter to create an instance of a builder command factory 414A by executing a command. For example, the interpreter command may be "CommandFactory commandfactory=NewCommandFactory( )". This causes the interpreter 412A to read a base command factory object from memory and to create the instance of the builder command factory 414A for executing the command string at issue.

The interpreter 412A passes the command string to the builder command factory 414A. Generally, the builder command factory 414A then will read the base command object from memory, create an instance of that object for the particular command string, and pass the created object back to the interpreter 412A.

It will be appreciated that the memory may be a volatile memory and/or a non-volatile memory, such as a non-volatile random access memory (NVRAM), a read only memory (ROM) and permutations thereof, a random access memory (RAM), a disk drive, and/or other types of memory.

The builder command factory 414A receives the command string Create Decision Color @COORD. The builder command factory 414A reads memory and retrieves a base command object, in this instance a CommandCreate. The builder command factory 414A creates an instance of the CommandCreate object with an execute method to create a decision node object named Color, including all the inheritance methods and properties of a decision node object. The builder command factory 414A passes the CommandCreate object to the interpreter 412A. Thereafter, the builder command factory 414A destroys itself.

The interpreter 412A receives the CommandCreate object and runs the execute method causing the creation of the object named Color having a type decision node, including the subclass objects of a decision node object. The interpreter 412A transmits the object Color to the process manager 410, and the process manager transmits the object Color to the builder collector 416. The interpreter 412A returns control of the builder 106A to the process manager 410 and destroys itself.

Figure 5C:
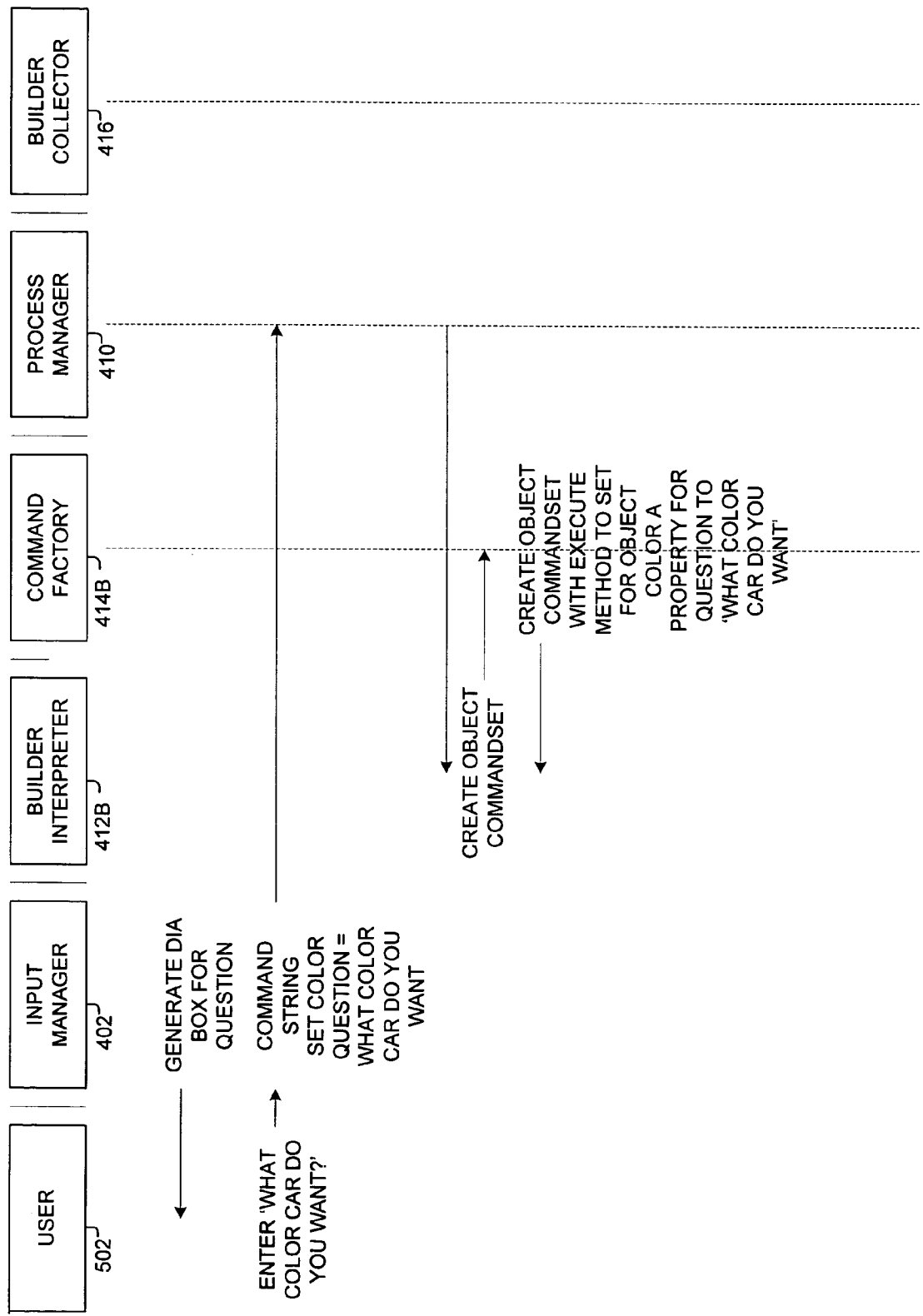
FIG. 5C is a continuation of the diagram of FIG. 5B.
Figure 5D:
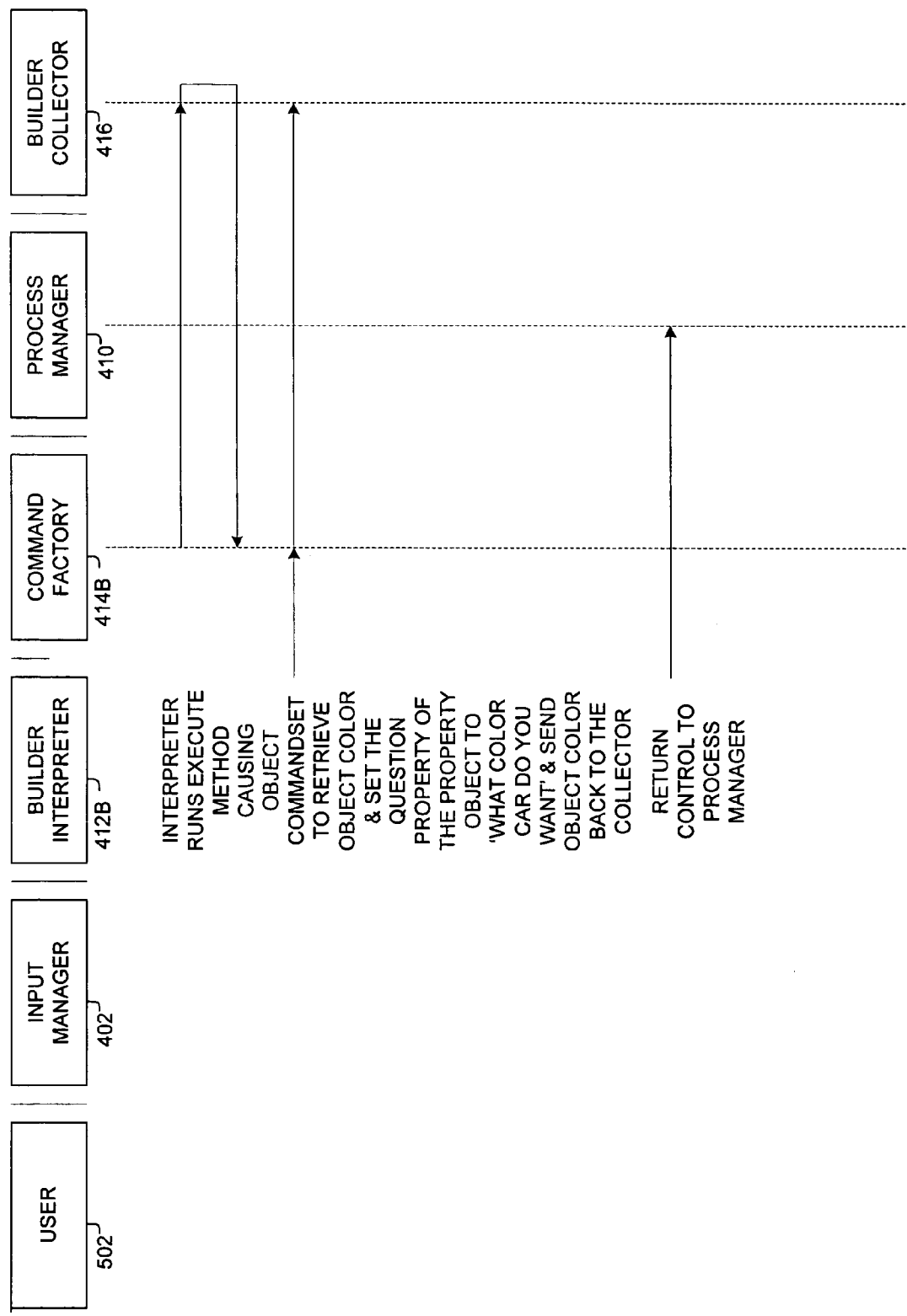
FIG. 5D is a continuation of the diagram of FIG. 5C.

Referring now to FIGS. 5C-5D after the input manager 402 generates the dialogue box requesting the name of the decision type object, the input manager generates a dialogue box asking what the question will be for the newly created object called Color. In this example, the input manager 402 is configured to obtain arguments for one or more properties of the newly created object called Color. In this example, a decision node object has a property for questions and a property for options. Thus, the object Color also has properties for questions and options.

In response to the dialogue box requesting entry of a question, the user 502 enters "what color car do you want?" The input manager 402 receives the entry and generates a command string to set the first property for the object Color. In this example, the input manager 402 generates a command string for Set Color Question ="what color car do you want?" to the process manager 410.

As before, the process manager 410 creates an instance of the builder interpreter 412B and passes the command string to the builder interpreter. Upon receiving the command string, the builder interpreter 412B creates an instance of the builder command factory 414B and passes the command string to the builder command factory.

The builder command factory 414B receives the command string identifying the "set" command. The builder command factory 414B then creates an instance of an object called CommandSet by reading the base object CommandSet from memory and creating the object CommandSet with an execute method to set a question property for the object Color to "what color do you want?" The builder command factory 414B then passes the object CommandSet to the builder interpreter 412B and destroys itself.

The builder interpreter 412B receives the object CommandSet and runs the execute method. This causes the builder interpreter 412B to send a command to the process manager 410 to retrieve the object Color from the builder collector 416. The builder interpreter 412B then sets the question property of the property object to "what color car do you want?" In this example, the object Color has a sub-class property object called question, and the execute method causes the builder interpreter 412B to set the argument of the sub-class property object called question to "what color car do you want?" The builder interpreter 412B then transfers the object Color back to the process manager 410, and the process manager transmits the object Color back to the builder collector 416. The builder interpreter 412B returns control of the builder 106B to the process manager 410, and destroys itself.

Figure 5E:
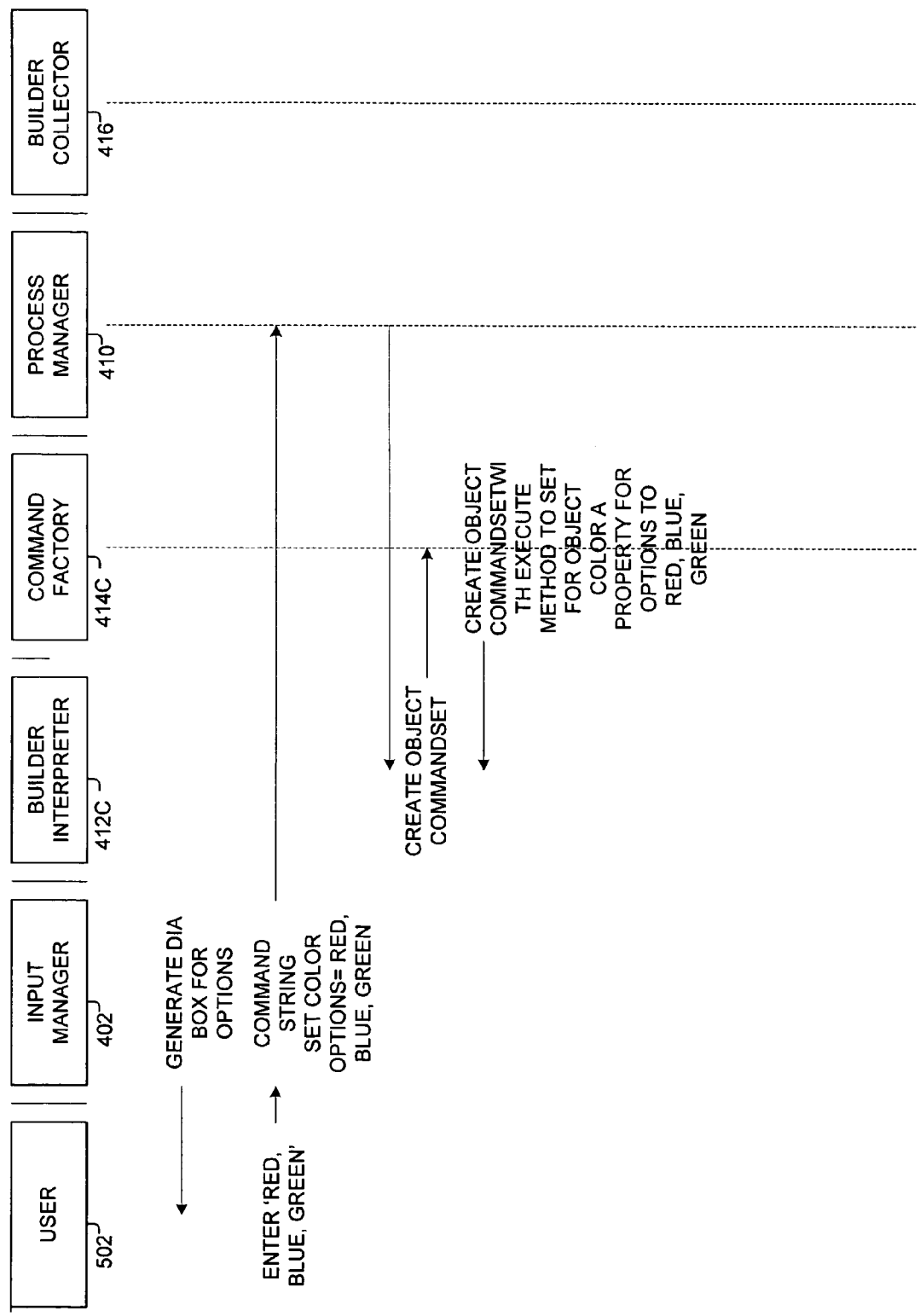
FIG. 5E is a continuation of the diagram of FIG. 5D.
Figure 5F:
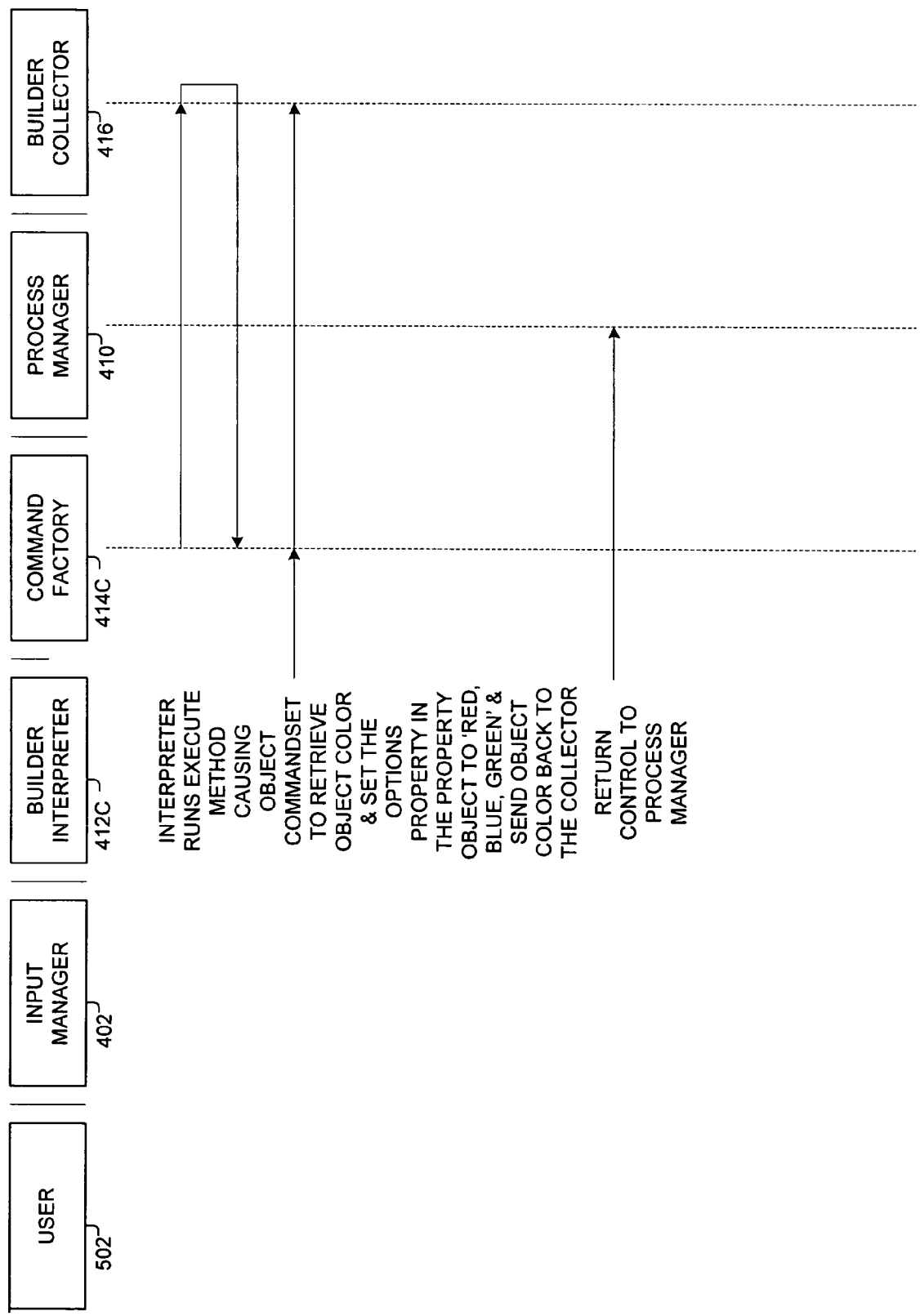
FIG. 5F is a continuation of the diagram of FIG. 5B.

Referring now to FIGS. 5E-5F, the input manager 402 generates for display to the user 502 a dialogue box for the options. In this example, the input manager 402 generates the "options" dialogue box as part of obtaining information to complete a set of command strings initiated by selecting the "create decision" button. Thus, the input manager 402 may be configured to obtain further information to generate additional command strings to the process manager 410 upon the selection of an initial command by a user 502 or reception of a command from some other source. In this example, the input manager 402 is configured to obtain information for determining the options property for the object Color having type decision node.

The input manager 402 generates a dialogue box for display to the user 502 to obtain information for the options. In response, the user 502 enters "red, blue, and green." The input manager 402 receives the entry and generates the command string "Set Color Options=red, blue, and green" to the process manager 410. The process manager 410 creates another instance of the builder interpreter 412C as described above and passes the command string to the builder interpreter.

Upon receiving the command string, the builder interpreter 412C creates an instance of the builder command factory 414C as described above. The builder interpreter 412C passes the command string to the builder command factory 414C. In response, the builder command factory 414C identifies the command string as having a "set" command, reads memory to find the object CommandSet, and creates an instance of the object CommandSet having an execute method to set the options property for the object Color to "red, blue, and green."

The builder command factory 414C passes the object CommandSet to the builder interpreter 412C and destroys itself.

The builder interpreter 412C runs the execute method of the object CommandSet. This causes the builder interpreter 412C to send a command to the process manager 410 to retrieve the object Color from the builder collector 416. The builder interpreter 412C then sets the sets the argument for the property object called options to "red, blue, and green." The builder interpreter 412C transmits the object Color back to the process manager 410, and the process manager transmits the object Color back to the builder collector. The builder interpreter 412C then returns control of the builder 106A to the process manager 410, and destroys itself.

In the above example, each time a command string was passed to the process manager 410, the process manager created the builder interpreter and passed the command string to the builder interpreter. Thereafter, the builder interpreter created an instance of a builder command factory and passed the command string to the builder command factory. The builder command factory created an instance of the specific command object with an appropriate execute method. The builder command factory then passed the instance of the command object to the builder interpreter and destroyed itself. Likewise, the instance of the builder interpreter executed the execute method of the command object and then destroyed itself.

By creating and then destroying an instance of the builder interpreter and/or the builder command factory each time a command string is to be processed, the builder 106 uses a more minimal amount of memory than otherwise would be used if multiple instances of builder interpreters and multiple instances of command factories were to be saved permanently or semi-permanently in memory. Thus, the builder 106B uses less memory when operating. Although, in other embodiments, the builder 106B may include a permanent or semi-permanent builder interpreter and/or builder command factory. In these instances, preferably only one instance of the builder interpreter and/or builder command factory will be resident in memory and will execute all command strings and create the required objects. However, in other cases, more than one instance of the builder interpreter and/or builder command factory may be included. In addition, one or more instances of the builder interpreter and/or builder command factory may be saved, loaded, or otherwise resident in one or more memory locations, including volatile and/or non-volatile memory locations.

Referring still to FIG. 4, in another example, the display manager 408 reads the contents of the builder collector 416 to render one or more objects for generation to a display. Initially, the input manager 402 transmits a display command to the process manager 410. The display command may include a reference to a zoom or to another view of one or more objects. The process manager 410 creates an instance of the builder interpreter 412 and passes the display command to the builder interpreter. The builder interpreter.412 executes the display command (via use of the builder command factory) and then destroys itself. This causes the process manager 410 to generate a display command with the reference vector of the builder collector 416 to the display manager 408.

The display manager 408 receives the command message from the process manager 410 to display one or more objects. The command message includes a reference, i.e. a pointer, to the builder collector 416. The display manager 408 executes the methods associated with the command message to acquire a reference to the vector in the builder collector 416 for each node object.

The display manager 408 references each node object in the builder collector 416 in turn to read each node object and its sub-class objects. The display manager 408 reads the node position object, the node property object, and the smart component object.

The node position object contains the absolute position information and the relative position information. The absolute position information identifies where and how the object is to be generated for display on the screen. The relative position information identifies the positioning relationship to other objects. The absolute position can be calculated from the initial absolute position in the node position object and from relative positioning, zoom, and attitude, based on the desired view. Thus, an associated graphic for the graphic node can be rotated or otherwise moved because the initial and relative position and the size of the graphic are known.

The property object contains variable properties and associated arguments that may be unique for each different type of node object. The node property object may override positioning information identified in the node position object. Additionally, the node property object may override other default arguments, including default color.

The smart component object contains specialized data, such as the actual graphic object to be generated for display. The smart component object also contains other information necessary to generate the graphic object for display. For example, the smart component object may include a graphic object for a sphere or pyramid, including a default color, such as red or blue.

Once the display manager 408 reads the node property object, the node position object, and the smart component object for each node object, the display manager 408 renders that object. As used herein, rendering means to generate one or more objects for display on a monitor or other output device.

The display manager 408 may receive command messages from the input manager 402 via the process manager 410 to modify one or more objects that are rendered. For example, if a user selects a zoom for one or more rendered objects, the input manager 402 transmits a command message to the process manager 410, and the process manager transmits the command message to the display manager 408. In response, the display manager 408 calculates the new position, size, and view of the selected one or more objects and again renders the objects for the selected view. A command message may be a command string.

In another example, a user may select a "debug on" command from the debug manager 406. In response, the debug manager 406 generates a "debug on" command to the process manager 410. The process manager 410 transmits the "debug on" command to the builder interpreter 412. The builder interpreter 412 creates a command debug object (via the builder command factory) and runs the associated execute method for the command debug object. Running the execute method causes the builder interpreter 412 to transmit a message to the debug manager 406 via the process manager 410 instructing the debug manager to turn the debug mode to "on," which causes a data stream to be generated to an output device upon execution of commands in a builder interpreter 412. Additionally, output from those executed commands also is transmitted to the selected output device. The data stream for the executed commands and the output of the executed commands is transmitted from the builder interpreter 412, to the process manager 410, and finally through the debug manager 406 to the output device. The debug mode may be turned off by transmitting a "debug off" command from the debug manager 406 to the builder interpreter 412 via the process manager 410. A process similar to the above stated debug on process will be completed.

In another example, the builder interpreter 412 creates an instance of a decision node. The resulting decision node instance is transferred to the process manager 410, and the process manager transfers the decision node object instance to the builder collector 416. When the display manager 408 is instructed to render a three dimensional image of a process being created for a seeker, the display manager reads the contents of the builder collector via a read command generated to the process manager 410. The display manager 408 reads the contents of the builder collector 416, including the properties and associated arguments of each property of each object. The display manager 408 converts the information identifying the properties and arguments of the objects into a visible representation of each object and generates that visible representation to a display or another output device.

Figure 6:
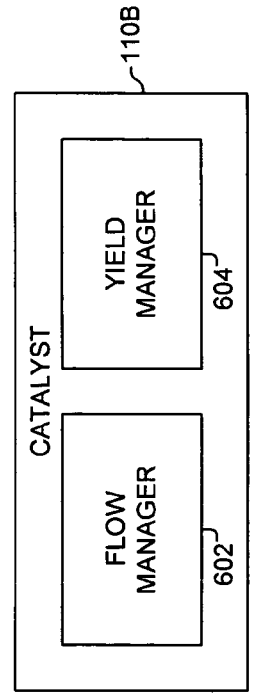
FIG. 6 is a block diagram of a catalyst system in accordance with an embodiment of the present invention.

FIG. 6 depicts an exemplary embodiment of a catalyst. The catalyst 110B of FIG. 6 comprises a flow manager 602 and a yield manager 604. Preferably the components of the catalyst 110B are implemented as objects in an object-oriented system.

The flow manager 602 manages the operation and flow of the catalyst 110B when operating a seeker. The flow manager 602 retrieves objects and/or other data required for operation of a seeker, such as from a repository. The flow manager 602 also controls storage of objects and/or other data, such as to a repository. The flow manager 602 controls operation of the seeker and generation of objects and/or data to interfaces.

The flow manager 602 controls and manages the operations of the catalyst 110B, including storage and retrieval of data, presentation of interrogatives, collection of assertions and other data, and the flow of future interrogatives based upon assertions. Additionally, the flow manager 602 determines if other seekers or objects are to be activated and activates those seekers or objects as needed. For example, the flow manager 602 may activate an automation seeker to retrieve data from an external database for use in a present seeker. Alternately, the flow manager 602 may determine that a present seeker is completed and activate another seeker or an automation object, such as an email object, upon its completion to provide data to an email account. Other examples exist.

User interfaces, such as the user interface 208 of FIG. 2, are added on top of the catalyst 110B (and the seeker system 102) to fit a selected seeker system environment and to facilitate a very light custom interface that can connect easily to the seeker system or components thereof. The flow manager 602 generates data to one or more of these user interfaces for different embodiments of a seeker.

For example, if a user interface is configured to present information to a user via a GUI, the GUI interface will be added on top of the catalyst 110B, and the flow manager 602 will generate data to the GUI interface. The GUI interface thereafter will process the data from the flow manager 602 and generate, for example, browser-enabled pages that are presented to the user to effect the collection of data or assertions. The user interface formats the browser-enabled pages according to the specified interface, including browser-enabled pages for a handheld device or a personal computer. In another example, the user interface may include a voice-enabled user interface or a voice response system interface, each configured to process data from the flow manager 602 for generation to a user via its interface.

Another interface may use JAVA in the form of tag libraries, forms, servlets, JAVA server pages (JSP), and other standard coding options. Another interface may include multiple sub-interfaces, including a graphic interface to pass graphics through pages or other browser-based strings, a flow interface to display text, a solution interface to set or retrieve components, a logic interface to set, retrieve, or other wise control variables, and an error interface to display error messages.

On startup, the flow manager 602 determines how a seeker will operate. In the instances in which interrogatives are presented to a user in a question format, the flow manager 602 determines the first question to be presented by effecting a query to the seeker. The flow manager 602 will receive in response to its query a pointer identifying the initial interrogative. The flow manager 602 creates a question object and populates the question object with the appropriate interrogative options and/or a selected list of potential assertions. The flow manager 602 processes a user response by identifying the assertion presented by the user, creating a logic object comprised of catalyst programming logic, and passes the logic object to an interpreter. The interpreter operates the logic to add component objects for a yield or to otherwise determine the yield or one or more portions of the yield.

The yield manager 604 manages output containers for a yield. The yield manager 604 monitors and temporarily stores results of an operation of a seeker while the seeker is operating and after the seeker has completed. For example, if a seeker is providing interrogatives to a user and collecting assertions in response to those interrogatives, the yield manager 604 temporarily stores the assertions and dynamically builds the yield while the assertions are being collected by the seeker. Additionally, in this example, the yield manager 604 monitors the paths of which interrogatives are presented and the assertions that are collected in response to interrogatives so that, if a user steps back to change an assertion, the yield manager 604 is able to identify assertions to be removed and/or components or processes to be removed from the yield that correlate to the removed assertions.

The catalyst 110B may be configured to operate in multiple modes, including a linear mode and an object mode. Linear mode operations typically represent data as a list. Object mode operations typically represents data as one or more sets. A set may include interrogatives, assertions, and/or logic, or any combination thereof. The linear mode is easy to understand and to program. However, the object mode may provide greater power and flexibility in some instances given the complexity of programming for the object mode.

Figure 7:
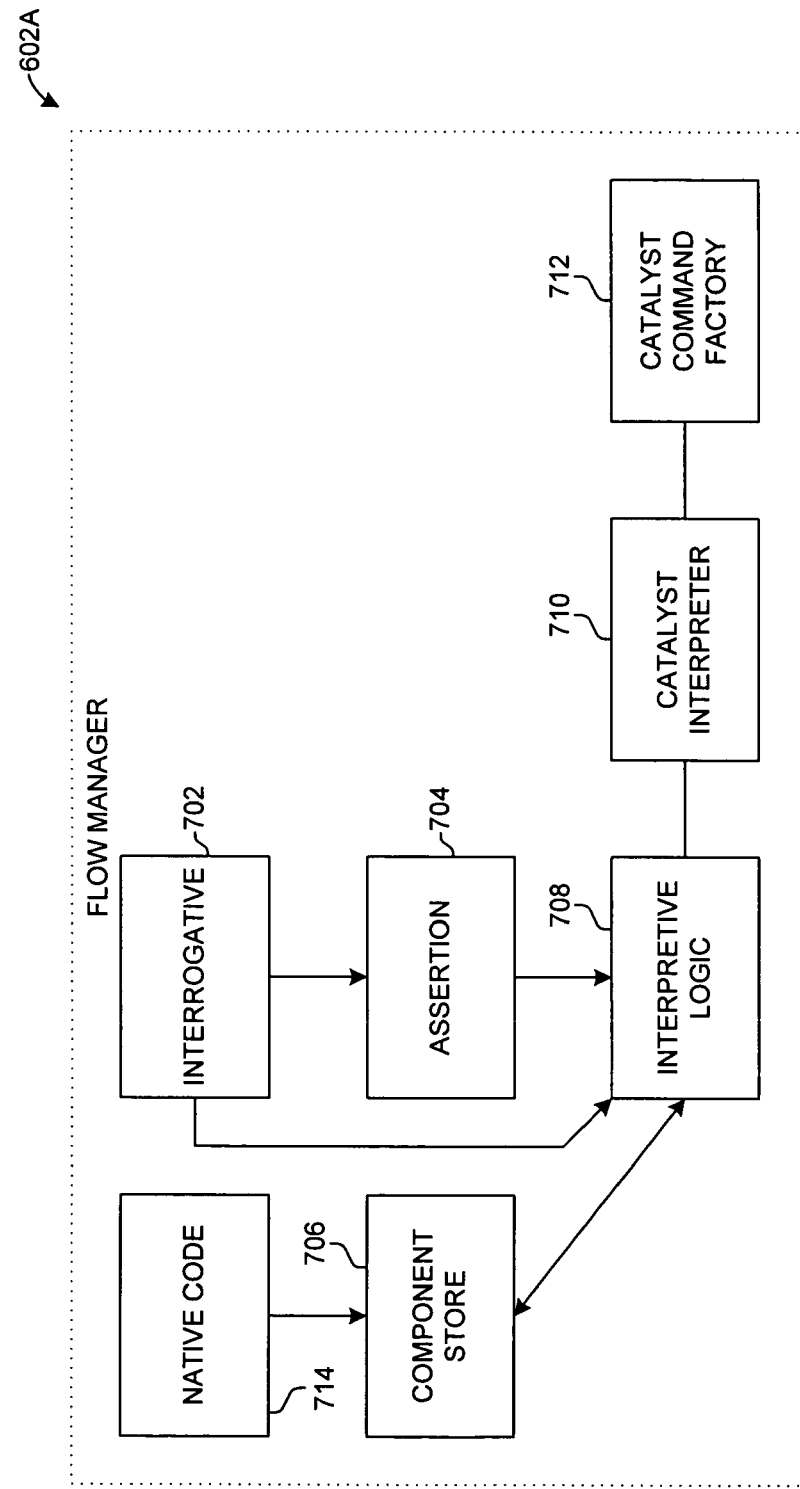
FIG. 7 is a block diagram of a flow manager in accordance with an embodiment of the present invention.

FIG. 7 depicts an exemplary embodiment of a flow manager for the object mode. In the embodiment of FIG. 7, the flow manager 602A comprises an interrogative 702, an assertion 704, a component store 706, interpretive logic 708, a catalyst interpreter 710, a catalyst command factory 712, and native code 714. The native code 714 is optional. While only one interrogative 702, assertion 704, component store 706, interpretive logic 708, interpreter 710, and command factory 712 are depicted in FIG. 7 for simplicity, one or more may be included in an instance of the flow manager 602A. Thus, for example, multiple interrogatives 702, multiple assertions 704, multiple component stores 706, multiple interpretive logic 708, multiple interpreters 710, and multiple command factories may be included in an instance of the flow manager 602A.

The interrogative 702 generates information to a user to initiate a response or activates some system level process to provide input to the seeker. The interrogative 702 initiates an action for which a response provides one or more selection directives from a source, such as a user input, a data stream, or a program. The interrogative 702 also transmits to the interpretive logic 708 the specific interrogative for which an assertion is accepted. Examples of an interrogative 702 include a question interrogative, a listener interrogative, and a component execution interrogative.

Question interrogatives have associated assertion interrogatives that can be associated to generate responses to the question interrogatives. Thus, a question interrogative is constructed with at least one assertion and a logic object as a set so that a question may be generated with one or more assertions, such as options in a dropdown menu. The logic is used to identify whether the assertion is a dropdown selection or a text or other entry. The logic also is used to receive the assertion in response to the interrogative.

A listener interrogative is a system level program that intercepts one or more streams of data and monitors the stream or streams to identify and/or match a pattern of data. If the pattern is detected, a response is generated or an action is executed. For example, a listener interrogative may monitor a data stream for a specified pattern of bytes. If the pattern of bytes is detected by the listener interrogative, the byte pattern is returned to the listener interrogative to determine if the byte pattern matches an assertion. If an assertion is located that matches the byte pattern, logic that is associated with the assertion will be executed. Otherwise, the byte pattern is ignored. Other examples for other listener interrogatives exists.

Component execution interrogatives identify data from a component that completed execution and attempts to match the data to assertions, or data or object patterns in the assertions. Typically, component execution interrogatives process following the launching of an executable component.

The assertion 704 effects adding one or more components to the yield collector 808 or to change or set variables in the yield variables 806. The assertion 704 provides one or more potential responses that may be selected in response to an interrogative 702 or accepts other responses for an interrogative, such as a text response. The assertion 704 will transmit the selected assertion to the interpretive logic 708 and transmit the interrogative/assertion response combination to the response history 804.

An assertion may be part of a selectable list of assertions (referred herein as potential assertions) and represent a selection that is presented to the user. These are "closed" assertions, meaning that the content or value of the assertion cannot be changed by the user. A single assertion may be associated with an interrogative. Typically, in this case an "open" assertion would be used. The content, or value of an open assertion is determined by the environment in which it is exposed. In a question and answer environment, for example, the content of an open assertion can be set to what the user types in response to a question interrogative. The assertion 704 refers to a selected closed potential assertion or an entered open potential assertion.

Each assertion 704 may be associated with one or more command strings to effect adding a component, such as ADD [component] QTY 3 to add a quantity of three components to the yield collector 808. When the interrogative 702 passes the instant interrogative to the interpretive logic 708, and the assertion 704 passes the assertion to the interpretive logic, the interpretive logic reads from memory the command string associated with the interrogative/assertion combination. In this example, the interrogative logic 708 reads from memory ADD [component] QTY 3. The interpretive logic 708 creates a catalyst interpreter 710, which creates a command factory 712. The command factory 712 rads the command string ADD [component] QTY 3 and creates a CommandAdd object having an execute method to add a quantity of 3 components to the yield collector 808. The command factory 712 passes the CommandAdd object to the catalyst interpreter 710 and collapses itself. The catalyst interpreter 710 executes the execute method, causing the interpreter to add a quantity of 3 components to the yield collector 808. The catalyst interpreter 710 then returns control to the interpretive logic 708 and collapses itself.

Additionally, the assertion 704 points to the next interrogative based upon an assertion selected for an immediate interrogative. The assertion 704 has next interrogative logic that determines the next interrogative based upon current and prior assertions and executes a method to execute the next interrogative. That next interrogative may, for example, be an interrogative that is generated for display to a monitor to determine a next assertion or an interrogative to execute another seeker. Other examples exist.

The assertion 704 may have nested logic to execute nested interrogative and assertion combinations. Those nested interrogative and assertion combinations then may execute other interrogative and assertion combinations, and so on. Similarly, the assertion 704 may have nested interrogative and assertion objects, such that an assertion has a nested interrogative, which in turn has a nested assertion, and so on until the flow manager 702 fully executes a seeker.

The assertion 704 further may include automated responses to interrogatives. An assertion 704 also may accept native code, such as JAVA or C++ code that has been added to the flow manager 602A.

The component store 706 contains a list of components for a seeker by component identification and corresponding component type. The list of components may be, for example, a list of parts. In this example, each component is a part that can be selected to be to be added to a system for a final configuration. Additionally, the component store 706 may be configured to derive specialized components using logic to combine one or more components to create a new component or to dynamically obtain a component, such as from implementing a hyperlink to a web site and obtaining data to identify and/or create a new component.

Component types may include graphic, form, business function, tracking, modifier, accumulating, distributing, and others. A GraphicComponent associates graphics with component data. A FormComponent consolidates information from a form associated with a component. A BusinessFunctionComponent contains a business rule. A TrackingComponent forms the base (in the collector) of a component. A ModifierComponent attaches to base components in the collector and modifies the base components. An AccumulatingComponent accumulates numbers in conjunction with Modifier Components. A DistributingComponent is a ModifierComponent that creates a second connection with a second base component.

The interpretive logic 708 is configured to accept data from the interrogative 702 and the assertion 704. The interpretive logic 708 reads from memory a command string set associated with an interrogative/assertion selection. The interpretive logic 708 creates an interpreter 710 to execute the command strings and to add components, processes, methods, and/or automated objects or seekers to the yield collector 808. These command strings may e referred to as catalyst programming language code/

Generally, the interpretive logic 708 processes command strings that are associated with interrogative/assertion combinations. Although, other command strings may be generated to, and processed by, the interpretive logic 708. The interpretive logic 708 operates as a controller and task manager to determine when one or more interpreters are to be created, which command strings or command strings sets are to be passed to one or more interpreters, where to store components or to set variables, and what other processes to complete. Generally, the interpretive logic 708 refers to methods of the flow manager 602A that effect the interpretation of logic.

The interpreter 710 receives command strings and command string sets and executes associated commands, such as command objects or execute methods of objects. The interpreter 710 creates a command factory 712, when needed, to create command objects and other objects based on command strings and command string sets received from the interpretive logic 708. The interpreter 710 determines when and whether one or more command factories are to be created and which command strings or command string sets are to be passed to one or more command factories. However, the function and operation of the command factory 712 may be included with the interpreter 710 without having the separate command factory. The interpreter 710 also may be configured to determine where to store components or to set variables and what other processes to complete when executing commands.

In some embodiments, the interpreter 710 is created to process a command string and execute associated command objects. The interpreter 710 thereafter collapses itself. In other embodiments, more than one interpreter 710 is created, each for one or more command strings. Other embodiments may include a persistent interpreter or more than one persistent interpreters, whether object oriented or in some other form.

The command factory 712 receives one or more command strings or command strings sets and creates executable commands. Preferably, the command factory 712 creates command objects having execute methods. In one example, the command factory 712 is configured to read a command string, retrieve from memory a base command object corresponding to the command, create an instance of that base command object for the command in the command string with an execute method, and pass the one or more command objects to the interpreter 710. The execute methods may be based on the name, type, operator, and argument in the command string. Alternately, the execute methods may include base methods and/or commands from the base command object. Other embodiments may include commands and code other than objects.

In some embodiments, the command factory 712 is created to generate an instance of an object for a command string, and the command factory thereafter collapses itself. In other embodiments, more than one command factory is created, each for one or more command strings. Still other embodiments may include a persistent command factory or more than one persistent command factories, whether object oriented or some other form.

In some embodiments, a component factory is created when the command factory 712 creates a CommandAdd object from an Add command. The execute method of the CommandAdd object may contain and execute a command, such as ComponentFactory componentFactory =new ComponentFactory(Component Type). In these cases, the command factory 712 passes the CommandAdd object to the catalyst interpreter 710, and, when the catalyst interpreter 710 executes the execute method of a CommandAdd object, a component factory is created.

The Add command may include an argument that is added between the brackets following the command. The argument may be a component identifier, such as MGX30. In this example, MGX30 is a component identifier and is located in the component store 706 along with an associated component type.

Upon execution of the CommandAdd object execute method, a new component factory is created, and the component type is passed to it. The component factory determines the appropriate component class to be created based on the component type. On this basis, the component factory accesses the appropriate component class object from memory, instantiates an instance of the component class object, and returns the component class object instance to the CommandAdd object. The CommandAdd object issues a query to memory requesting detailed information about the particular component being created with the particular type. The newly created component then is populated with the detailed information and the component is added to the yield collector 808.

Native code 714 represents JAVA code, C++ code, or other code that has been added to a derivation of a component object to achieve a unique behavior when the component is added to a yield. The native code may be added to modify a component, an interrogative, an assertion, and/or a yield collection.

Figure 8:
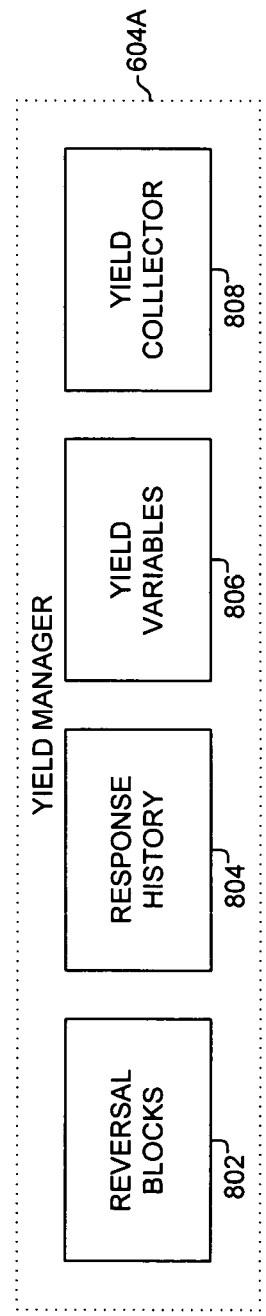
FIG. 8 is a block diagram of a yield manager in accordance with an embodiment of the present invention.

FIG. 8 depicts an exemplary embodiment of a yield manager. The yield manager 604A of FIG. 8 comprises a reversal block 802, a response history 804, yield variables 806, and yield collector 808.

The reversal block 802 stores a set of "anti-logic." Anti-logic includes reversal commands that are executed if a user backs up in a seeker, such as to a prior interrogative. The anti-logic is pushed into a stack in an order opposite to the order in which the original set of interpretive logic was created and executed to create the original interrogative/assertion command string sets with their associated component selections. The anti-logic is executed when a user changes an assertion to a prior interrogative or moves backward in an interrogative sequence so that components are removed from a yield collector 808.

For example, a set of interrogatives may ask questions for which the assertions provide answers. In response to a first question, a variable named MyVariable is set to a value of 1. In response to a second question, MyVariable is set to a value of 3. The reversal block 802 in this example will contain anti-logic for the second question and the first question. If the user backs up to the first question, the anti-logic of the second reversal block (for the second question) is executed, and the value for MyVariable is returned to the value of 1. In this manner, if a user backs up to answer the second question again, the value of MyVariable will be the same as it was after the first question was answered. Anti-logic for the first question would remove MyVariable completely, since the variable and its value were not present prior to answering the first question.

The response history 804 tracks the history of all interrogatives and assertions throughout the course of a user session, including all instances and sessions of a catalyst or a seeker. If a user backs up to a prior interrogative, the history associated with that interrogative and its included assertions are removed. The response history 804 provides an audit trail for the interrogative and assertion combinations.

The yield variables 806 track the arguments of variables that are set by command strings and their execution. The variables assist in the determination of what components are to be added to the yield collector 808. Additionally, variables may be used to assist in the determination of how a sequence of interrogatives and associated assertions have been generated. Variables hold conditions that are collected during the course of running a seeker in the yield variables 806. Based on the value of these variables, the logic assigned to the seeker affects the yield.

The yield collector 808 collects data and/or objects that are added to create a yield. The yield collector 808 stores and manages the components for the yield. Components may be added or removed from the yield collector 808 during the operation of a seeker. Additionally, the yield collector 808 may add one or more modifier components to a component. For example, the yield collector 808 may contain three components of type ball. Subsequently, the yield collector 808 may add a modifier of red to the first ball component, a modifier of white to the second ball component, and a modifier blue to the third ball component. Other modifiers also may be added.

A yield collector 808 may include a summary collector, an accumulator collector, a detail collector, and a staging collector. The yield collector 808 may contain objects that have behavior, that broadcast events, that own other collectors, and that take other actions.

A summary collector identifies a component and its quantity. If a component reference is added to a summary collector that already contains that type of component, the quantity for that component simply is incremented. Thus, the quantity number is changed to reflect the number of times a component of that type has been added.

An accumulator collector provides the ability to perform mathematical calculations and accumulations, by itself or in conjunction with another collector. For example, the accumulator collector may contain an object identified as cost. Each time a part is added to the collector, the cost object adds the cost of that part to the already accumulated total cost to produce a final total cost. Additionally, the accumulator collector may accumulate different objects and components.

A detail collector creates a separate entry for each addition of each type of component, as opposed to simply adjusting the quantity of a component. The detail collector identifies each instance of a component separately, instead of summarizing multiple instances of a component.

A staging collector enables a secondary seeker to be run against the results of a primary seeker. Results of the first seeker are collected in the primary staging collector, and the secondary seeker is run against those components in the primary collector to produce a final yield that is collected in the secondary collector. Staging collectors may be nested as deeply as required.

The yield collector 808 further may include a cumulative collection, an iterative collection, and/or an accumulative collection. A cumulative collection identifies a component and its quantity. An accumulative collector identifies components by group and the quantity of the items in that group. An iterative collection identifies each entry of a component, including an iterative count of each quantity as it is added.

One or more of these types of collectors may be included in the yield collector 808. For example, if a component named PXM1 belongs to a group called group 1, adding this component to each of the initial collector types will yield the following result: cumulative=PXM1QTY 1; accumulative=group 1 QTY 1; iterative=PXM1-1. Adding a second PXM1 component yields the following: cumulative=PXM1QTY 2; accumulative=group 1 QTY 2; iterative=PXM1-1, PXM1-2. Adding an MGX10 component belonging to group 2 equates as follows: cumulative=PXM1QTY 2, MGX10QTY 1; accumulative=group 1 QTY 2, group 2 QTY 1; iterative=PXM1-1, PXM1-2, MGX10-1. Adding an LDD7 component belonging to group 1 equates as follows:

cumulative=PXM1QTY 2, MGX10 QTY 1, LDD7 QTY 1;
accumulative=group 1 QTY 3, group 2 QTY 1;
iterative=PXM1-1, PXM1-2, MGX10-1, LDD7-1.

In linear mode, the yield collector 808 may contain a list holding the results of selected components. In this instance, the yield collector 808 may produce a graphic representation of the selected components. Whereas, in the object mode, the yield collector 808 represents an open ended interface.

In the object mode, the components of a collector may contain data and/or behavior. The components may be capable of executing associated code. The components may execute and interact with outside systems, such as creating a link to a web site and obtaining data from that web site.

It will be appreciated that a super-user may use the yield manager 604A to track in real time how a user uses a seeker or other tools, including tracking each assertion for each interrogative in real time and the results of those assertions in real time. A super-user may identify each step taken by a user within a seeker at the process level. For example, each time a user provides an assertion to an interrogative, the interrogative 702, the assertion 704, and/or components from the component store 706 are stored in one or more of the reversal blocks 802, the response history 804, the yield variables 806, and the yield collector 808. The output of the yield collector 808 and the components of the yield manager 604A can be generated to a super-user so that the super-user may see the interrogatives and assertions and the components collected in the collector 808. Additionally, since the seeker dynamically builds the yield as assertions are provided to interrogatives, the super-user can see dynamically how the components fit together and the ultimate yield.

The systems of FIG. 7 and FIG. 8 operates as follows. In a first example, the flow manager 602A is a persistent object. Additionally, the reversal block 802, the response history 804, the yield variables 806, and the yield collector 808 are persistent objects. The interrogative 702, the assertion 704, and the component store 706 are created dynamically as a seeker executes. Interrogatives and assertions are stored in the reversal blocks 802, the response history 804, and the yield variables 806. Components are stored in the yield collector 808. During the execution of the seeker, each instance of a command string, logic object, interpreter, and command factory are created, executed, and then destroyed. This enables the flow manager 602A to minimize its use of memory.

Referring still to FIG. 7, in another example, a user opens a browser page to launch a seeker. The flow manager 602A and interpretive logic 708 are present. The user selects the seeker, thereby launching the catalyst. It will be appreciated that the catalyst also has an expert user interface to provide for customized functionality as needed. The expert interface in this example uses JAVA in the form of tag libraries, forms, servlets, JSPs, and other standard coding options.

The interpretive logic 708 identifies the first interrogative of the seeker. The first interrogative typically is the first interrogative in a list of interrogatives. However, a pointer can identify any interrogative as being the first interrogative.

The flow manager 602A passes a string to the seeker system 102A. The seeker system 102A then passes the string to a user interface. The user interface processes the string to render the first interrogative to the user. The string in this example is a JSP string. For example, the JSP string may contain tags and a series of graphics with coordinates identifying the location at which the graphic is to be placed, the height and width of the graphic, and other rendering information. Other strings or commands may be used for other interfaces. Other JSP strings may contain tags and text to be displayed.

It will be appreciated that, in this example, the first interrogative contains the potential assertions for the interrogative. Thus, the assertions are provided for display along with the interrogative. One of the assertions are selected. The interrogative 702 transmits the interrogative to the interpretive logic, and the assertion 704 transmits the assertion to the interpretive logic 708.

The interpretive logic 708 reads memory to identify the command string set associated with the selected interrogative/assertion combination. The interpretive logic 708 retrieves the command string set. Additionally, the interpretive logic 708 reads the base interpreter object from memory and creates an instance of the interpreter 710. The interpretive logic 708 then passes the command string set to the interpreter 710. In other examples, the interpretive logic 708 may create multiple interpreters to process the command string set. One or more command strings then may be sent to each interpreter. Alternately, the interpretive logic may create multiple or nested interpreters to process the command string set.

The interpreter 710 receives the command string set. The interpreter 710 reads from memory the base command factory object and creates an instance of the command factory 712. The interpreter 710 then passes the commands to the command factory 712. In other examples, the interpreter 710 may create multiple command factories to process the command string set. One or more command strings then may be sent to each command factory. Alternately, the interpreter 710 may create multiple or nested command factories to process the command string set.

The command factory 712 receives the command string set. The command factory 712 identifies each command in the command set, reads memory to retrieve a base object for each command, and creates an instance of that command object for each command string in the command string set. The command factory 712 creates the command object that contains an execute method for each command object depending on the command, the name, the type, and the arguments in each command string. The command factory 712 passes the command objects to the interpreter 710, or if more than one interpreter is created to the associated interpreter for that command object, and the command factory thereafter destroys itself.

The interpreter 710 executes the execute method of each command object. Executing an execute method of a command object may cause the interpreter 710 to retrieve an instance of a component from the components 706 and add that instance of the component to the yield collector 808. Additionally, executing the execute method may cause the interpreter 710 to set a variable or an argument in the yield variables 806. Further examples include: an "if" command that tests the value of a variable or mathematical expression involving a variable and subsequently causes branching in the code; a "disable" command disables interrogatives so that an attempt to access them will fail, thereby forcing the catalyst to use the next qualified successive interrogative; a "goto" command stipulates the next interrogative to access; and a "launch" command forces either a web page or a local executable to be "launched" or "run". Other examples exist. In each instance, the interpreter 710 will create the anti-logic associated with each command and save the anti-logic in the reversal blocks 802. The interpreter 710 then passes control back to the interpretive logic 708 and destroys itself.

While the interpretive logic 708 is receiving and processing the first interrogative/assertion results, the assertion 704 stores the interrogative/assertion response in the response history 804. Additionally, the assertion 704 points to the next interrogative in the series of interrogatives based on the prior interrogative/assertion combination. The assertion 704 causes the interpretive logic 708 to generate the next interrogative and assertion combination, if any, as described above. The process continues in the same manner until all interrogatives are provided with assertions and the seeker completes.

When the seeker has completed, the yield collector 808 contains the yield for the seeker. The yield collector 808 may contain data, such as graphics, text lists, quantities, costs, and/or other components identifying the total yield. It will be appreciated that, as the seeker is operating, the yield manager 604A dynamically builds the yield for the seeker based upon current assertions to interrogatives. Thus, a user may see at any point during the processing of a seeker the instance of the yield at that point based upon assertions to interrogatives.

If the user returns to a prior interrogative while operating the seeker, the anti-logic in the reversal blocks 802 execute to remove the settings in the yield variables 806 and the components in the yield collector 808. Similarly, the response history 804 may be modified to remove interrogatives and assertions that occurred after the selected interrogative to which the user returned. Alternately, the response history 804 may be modified to identify that the user returned to a prior interrogative, but keep the prior response history intact and store the additional response history.

In another example, the catalyst interpreter 710 adds a component to the yield collections 808. The catalyst interpreter 710 creates the command factory 712 and passes a command string to the command factory. If the command passed to the command factory 712 is an Add command, the command factory creates an instance of the CommandAdd object and passes the CommandAdd object back to the catalyst interpreter 710. When the catalyst interpreter 710 executes the execute method of a CommandAdd object, a component factory is created.

The Add command includes an argument that is added between the opening and closing brackets following the command, such as Add [MGX30]. The component identified by the argument is to be added to the yield collector 808. In this example, MGX30 is a component identifier and is located in the component store 706 along with an associated component type. Also, the execute method of the CommandAdd object contains and executes a command, such as ComponentFactory componentFactory=new ComponentFactory(Component Type).

Upon execution of the CommandAdd object execute method, a new component factory is created, and the component type is passed to it. The component factory determines the appropriate component class to be created based on the component type. On this basis, the component factory accesses the appropriate component class object from memory, instantiates an instance of the component class object, and returns the component class object instance to the CommandAdd object. The CommandAdd object issues a query to memory requesting detailed information about the particular component being created with the particular type. The newly created component then is populated with the detailed information and the component is added to the yield collector 808.

In another example, the interpretive logic 708 adds a component to the yield collector 808. An assertion is provided for an interrogative. The interrogative 702 passes the interrogative reference to the interpretive logic 708. The assertion 704 passes the assertion reference to the interpretive logic 708.

The interpretive logic 708 reads from memory the command string set associated with that interrogative/assertion combination. The interpretive logic 708 reads from memory the base object for an interpreter and creates an instance of the interpreter 710. The interpretive logic 708 then passes the command string set to the interpreter 710.

The interpreter 710 receives the command string set from the interpretive logic 708. The interpreter 710 then reads from memory the base object for the command factory and creates an instance of the command factory 712. The interpreter 710 then passes the command string set, one command string at a time, to the command factory 712.

The command factory 712 reads the base objects of each command string from memory and creates an instance of each command object. Each instance of each object preferably will contain one or more execute methods, including the execute method associated with the command itself and an execute method that will create anti-logic when that instance of the object is executed. For example, an instance of a set object shall contain a set command, such as the set command described above, and a parse command that, when executed for that instance of that object, will create anti-logic for the set execute method. The command factory 712 passes the instances of the objects back to the interpreter 710 and collapses itself.

The interpreter 710 receives the instances of the command objects from the command factory 712 and executes the execute methods of each command object instance. In this example, the command factory 712 creates a command object to add a component. Thus, the interpreter 710 executes the add execute method and adds a component to the yield collector 808. Additionally, the execute method contains a parse anti-logic command. The interpreter 710 executes that parse anti-logic command to create the anti-logic. The interpreter 710 then stores the anti-logic in the reversal block 802. The interpreter 710 then returns control to the interpretive logic 708 and collapses itself.

In another example, the interpretive logic 708 sets a variable for a component. In this example, a user selects an assertion for an interrogative. The assertion in this example identifies a type required for a component, such as a type ALLOY needed for the component WHEELS.

The interrogative 702 passes the interrogative to the interpretive logic 708. The assertion 704 passes the assertion to the interpretive logic 708. The interpretive logic 708 reads from memory the command string set associated with the particular interrogative/assertion combination. The interpretive logic 708 also reads from memory the base interpreter and creates an instance of the interpreter 710 for the command string set. The interpretive logic 708 passes the command string set to the interpreter 710.

The interpreter 710 receives the command string set from the interpretive logic 708. The interpreter 710 identifies the command string set as having commands. The interpretive 712 then reads from memory the base object for the command factory and creates an instance of the command factory 712. The interpreter 710 then passes the command string set to the command factory 712. In other examples, the interpreter 710 may create a separate instance of the command factory for each command string in the command string set.

The command factory 712 receives the command string set from the interpreter 710. For each command string, the command factory 712 reads memory to identify the base command object associated with the command in the command string. The command factory 712 creates an instance of that command object for each command string, including an execute method having the appropriate command and having the parse anti-logic command. In this example, the command factory 712 creates an instance of the CommandSet object including an execute method having a set command and a parse anti-logic command. The command factory 712 passes the instances of the command objects, including the CommandSet object, to the interpreter 710 and collapses itself.

The interpreter 710 receives the command objects from the command factory 712. The interpreter 710 executes the execute method for each command object, including the CommandSet object. In this example, when the interpreter 710 executes the execute method of the CommandSet object, the interpreter sets the identified variable and creates the anti-logic for the reversal blocks.

When the interpreter 710 sets a variable, the interpreter first determines if the variable object is located in the yield variables 806. If the variable object is located in the yield variables 806, the interpreter sets the argument for that variable. If the variable object is not located in the yield variables 806, the interpreter creates the variable object, stores the variable object in the yield variables 806, and sets the argument of the variable object as needed. In the present example, the variable object Wheel is located in the yield variables 806. Thus, the interpreter 710 locates the variable object Wheel in the yield variables 806 and sets the Wheel Type variable to the argument Alloy. The interpreter 710 processes the remaining command objects, if any, returns control back to the interpretive logic 708, and collapses itself. It will be appreciated that when the user provided the assertion to the interrogative, the assertion 704 saved the interrogative/assertion to the response history 804.

In other examples, an assertion made in response to an interrogative may require adding a component and setting a variable for that component. In this example, the command string set would include an add command and a set command. Thus, the command factory 712 will create an instance of a CommandAdd object having an execute method including an add command and a parse anti-logic command. The command factory 712 also will create a CommandSet object having an execute command with a set command and a parse anti-logic command.

When the interpreter 710 executes the execute method of the CommandAdd object, the interpreter 710 will add an object to the yield collector 808 for the component to be added. At that time, the interpreter 710 also will create anti-logic for the added component and save the anti-logic in the reversal block 802. When the interpreter 710 executes the execute method of the CommandSet object, the interpreter will set the variable of the variable object in the yield variables 806 if the variable object exists in the yield variables. Alternately, the interpreter 710 will create the variable object, add the variable object to the yield variables 806, and set the variable for the variable object. Additionally, the interpreter 710 will simultaneously or subsequently execute the parse anti-logic command, create the anti-logic for the set variable, and store the anti-logic in the reversal blocks 802. During this operation, the assertion 704 transmits the interrogative/assertion combination to the response history 804.

Figures 9, 10:
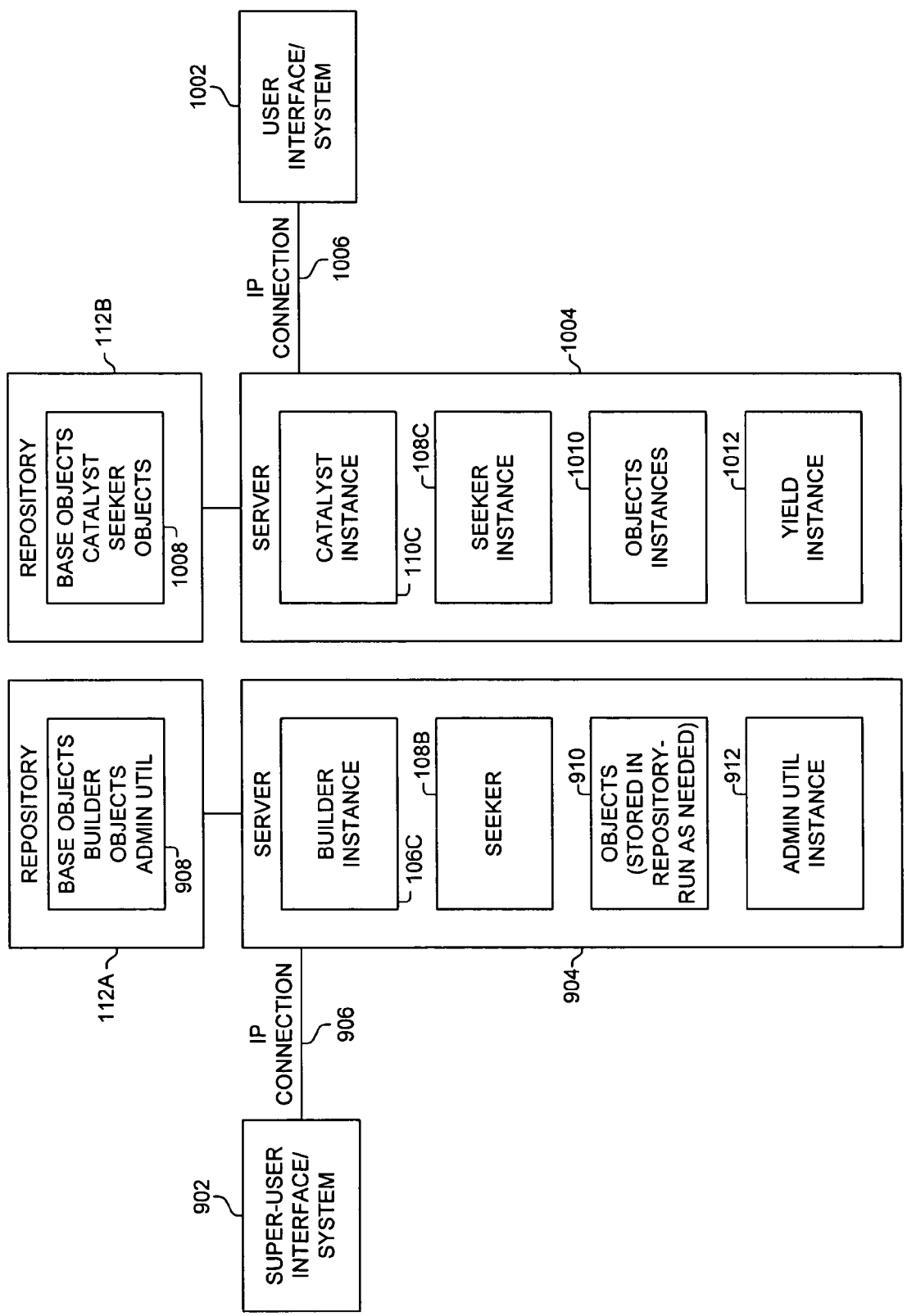
FIG. 9 is a block diagram of a super-user system connected to a server in accordance with an embodiment of the present invention.
FIG. 10 is a block diagram of a user system connected to a server in accordance with an embodiment of the present invention.

FIG. 9 depicts an exemplary embodiment of a super-user system 902 connecting to a server 904 over an IP connection 906. The server is connected to a repository 112A containing base objects 908 including, one or more builder objects, supporting objects for the builders, and administrative utilities (Admin Util). The repository 112A may contain other objects and data. For example, the repository 112A may contain data identifying passwords or other user identification for various users and/or super-users.

In this example, the super-user connects to the server 904 using a super-user system 902 having a super-user interface. The super-user interface may be any selected interface, including a GUI or another interface. In this example, the super-user system 902 connects to the server 904 via the IP connection 906. In other examples, another type of connection may be used, including a LAN connection, a WAN connection, or another type of network connection.

When the super-user system 902 connects to the server 904, the super-user system launches an instance of the builder. When launched, the server 904 reads the base builder object and associated supporting objects from the repository 112A and generates a builder instance 106C and any supporting objects 910. Additionally, the server 904 may read base administrative utility objects from the repository 112A and create an administrative utility instance 912.

The super-user using the super-user system 902 may use the builder instance 106C to create a seeker 108B. The super-user also may generate objects 910 needed to support the seeker 108B. Additionally, the super-user may use the administrative utilities instance 912 to create or modify administrative utility functions and/or objects, such as specifying user groups by user identification that will have access to the seeker 108B.

FIG. 10 depicts an exemplary embodiment of a user using a user system 1002 to connect to a server 1004 over an IP connection 1006. In this example, the user uses a user system 1002 having a user interface, such as a GUI or another interface. In this example, the user using the user system 1002 connects to the server 1004 via an IP connection 1006. However, other connection types may be used, including a LAN connection, a WAN connection, or another type of network connection.

The server 1004 is connected to the repository 112B. The repository 112B contains base objects 1008, including a base catalyst object, one or more base seeker objects, and supporting objects for the seeker and/or catalyst.

The user selects a seeker for implementation. The server 1004 reads the base objects for a catalyst and a seeker from the repository 1008. The server 1004 thereafter creates a seeker instance 108C and a catalyst instance 110C to run the seeker instance. The server 1004 also generates object instances 1010 to support the catalyst instance 110C and/or the seeker instance 108C.

The user operates the seeker instance 108B to create a particular yield instance 1012 for the seeker instance 108C, which is dependent on the assertions provided for interrogatives and other data associated with the implementation of the seeker instance 108C. Other instances of a yield may be generated based on other assertions and/or data provided for a seeker instance.

FIG. 11 depicts an exemplary embodiment of a builder operated on a stand-alone computer. In this example, the super-user system 1102 is a stand-alone computer, such as a personal computer. The super-user system 1102 has a super-user interface, such as a GUI, a voice-activated system, or another interface. The super-user system 1102 connects to the server 1104 over a connection 1106 to download a builder, supporting objects, and administrative utilities (admin Util) (optional).

The server 1104 may retrieve base objects 1108 for a builder, supporting objects, and administrative utilities from an associated repository 112C. The server 1104 thereafter may create instances of the objects and transmit instances of the objects to the super-user system 1102 over the connection 1106.

Once downloaded, the super-user system 1102 will contain a downloaded builder instance 106D, downloaded supporting objects instances 1110, and downloaded administrative utilities 1112. The super-user will select the downloaded builder instance 106D for operation. The user thereafter will operate the downloaded builder instance 106D with downloaded supporting objects 1110, if any and if needed, to generate a seeker 108D. Other instances of a seeker may be generated for the downloaded builder instance 106D. The super-user system 1102 then can upload the seeker 108D to the server 1104 for storage in the repository 112C.

FIG. 12 depicts an exemplary embodiment of a seeker operated on a stand-alone computer. In this example, the user system 1202 is a stand-alone computer, such as a personal computer. The user system 1202 has a user interface, such as a GUI, a voice-activated system, or another interface. The user system 1202 connects to the server 1204 over a connection 1206 to download a seeker, a catalyst, and supporting objects.

The server 1204 may retrieve base objects 1208 for a catalyst, a seeker, and supporting objects from an associated repository 112D. The server 1204 thereafter may create instances of the objects and transmit instances of the objects to the user system 1202 over the connection 1206.

Once downloaded, the user system 1202 will contain a downloaded catalyst instance 110D, a downloaded seeker instance 108E, and supporting downloaded objects instances 1210. The user will select the downloaded seeker instance 108E for operation, thereby launching the downloaded catalyst instance 110D. The user thereafter will operate the downloaded seeker instance 108E to generate a yield instance 1212. Other instances of a yield may be generated for the downloaded seeker instance 108E.

Figure 13:
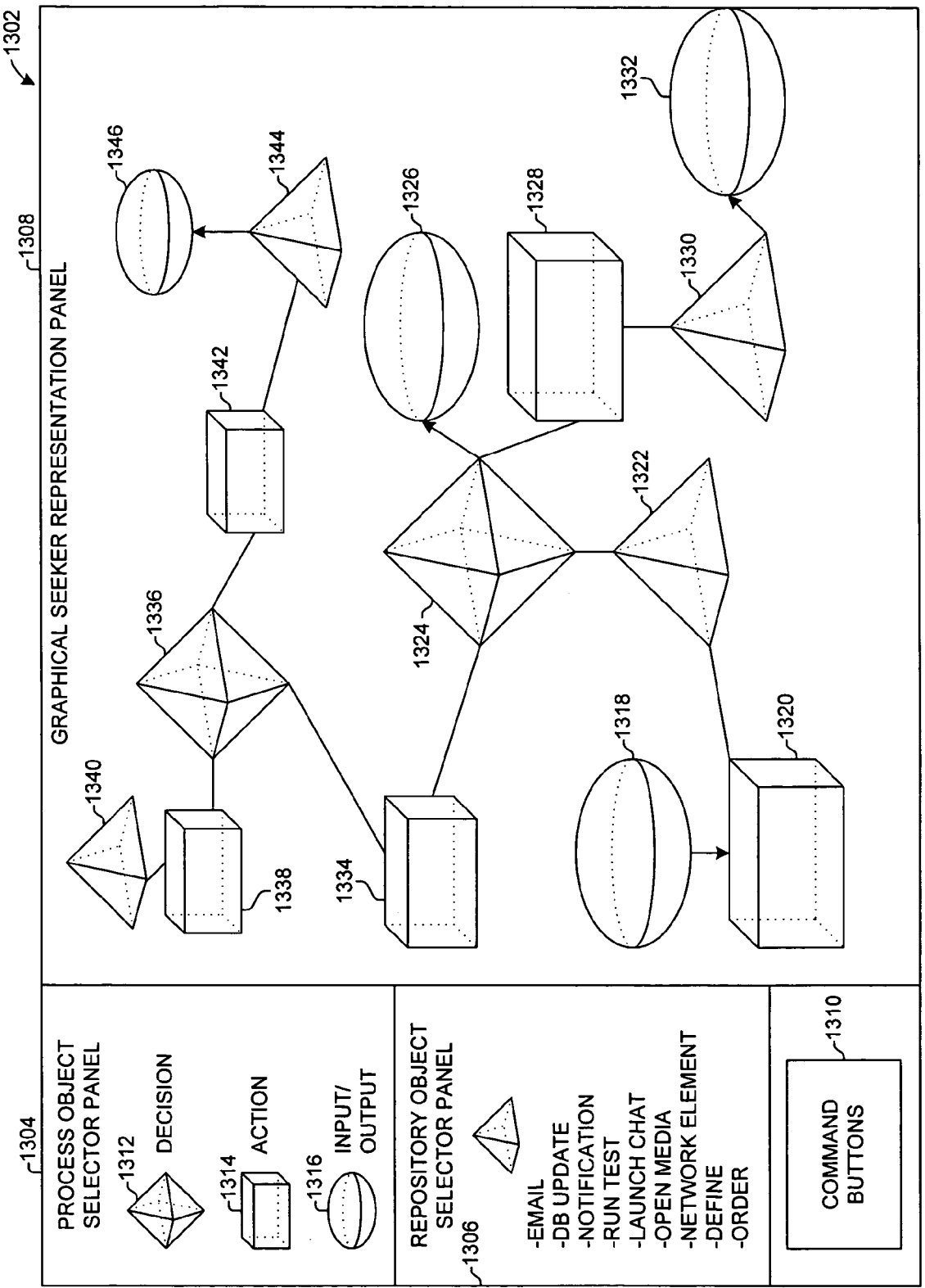
FIG. 13 is a block diagram of a three dimensional interface in accordance with an embodiment of the present invention.

FIG. 13 depicts an exemplary embodiment of a 3D user interface. The 3D interface 1302 of FIG. 13 comprises a process object selector panel (POSP) 1304, a repository object selector panel (ROSP) 1306, a graphical seeker representation panel (GSRP) 1308, and command buttons 1312.

The POSP 1304 enables a super-user to select common elements of a process for efficient representation of a seeker as it is being developed or as it is being maintained in a builder. As elements are selected, they become part of the graphical representation in the GSRP 1308. The objects identified in the POSP 1304 may be dragged and dropped to the GSRP 1308 for the process to be built in the context desired. The common elements represented are typical to process representation. In one embodiment, the process elements include a decision 1312 having associated options, an action 1314, and an input/output 1316.

The decision element 1312 marks the discrimination point at which an assertion/option is to be selected or some other assertion is to be made. The decision element 1312 includes possible assertions or entry points that will be processed as an assertion. For example, a decision may include assertions for yes or no. Another decision may include assertions for blue, red, and green. Another decision element 1312 may include assertions for a text entry. Additionally, a decision element 1312 or its associated assertion may include a link, such as a uniform resource locator (URL), to a help file or to another help location. A decision element 1312 may ask a question or provide some other interrogative.

The action element 1314 is a manipulation point. The action element 1314 identifies an action to be taken in response to a decision, in response to an assertion made in response to a decision, or in response to an output. For example, a decision element 1312 may inquire if a car tire is flat. An assertion option may include yes or no. If the yes assertion is selected, the action element 1314 will include "change the tire." The action element 1314 also may include a link to a help file or to another help location to describe how to change the tire. Further, the action element 1314 may include an automated action to send an email to the nearest service station requesting service to change the tire. The email may include the global positioning system (GPS) coordinates of the individual with the flat tire.

The output element 1316 identifies the outcome of an action or a decision. For example, the output element 1316 may designate a report to be generated in a specific format based upon an assertion selected at a decision element 1312. In another example, the output element 1316 may identify a package that is sent in response to an action element 1314.

The ROSP 1306 includes objects having special functions that may be required during the manipulation and/or creation of a seeker. These objects may be stored in one or more repositories and may be selected for use through the ROSP 1306. The objects identified in the ROSP 1306 specify the object to be selected and the repository where the object is stored or the portal to the repository. Once selected, the object is represented on the GSRP 1308.

The objects in the ROSP 1306 maybe dragged and dropped into the process in the context desired when building a seeker represented in the GSRP 1308. Selection of these objects eventually will result in the launch of the objects as the seeker, once completed, is used by a user. For example, the objects in the ROSP 1306 may include automation objects, such as email objects, database (DB) update objects, notification objects, automated test run objects, chat launching objects, medium opening and/or operating objects, and other automated objects, smart objects, and/or data objects.

The GSRP 1308 identifies the 3D representation of the seeker being built and its required elements and/or seeker objects. The GSRP 1308 provides for the efficient manipulation of processes and related seeker objects. Individual elements may be executed when selected from the ROSP 1308, properties for the elements may be set and/or identified, and elements may be manipulated. The GSRP 1308 uses a drag-and-drop functionality to locate or manipulate elements, including connection lines and/or points. Additionally, any element, including connection lines and/or points, may be selected to specify properties.

The command buttons 1310 may include any command buttons necessary for the operation of the 3D interface 1302. For example, the command buttons 1310 may include Create Decision, Create Pipe, Create Process, Create Output, and Create Smart Component. These command buttons 1310 are used to create an instance of a decision object, a pipe object, a process object, an output object, and a smart component object, respectively.

Additional commands may be included in the command buttons 1310. For example, commands may include Enable, Disable, If, Endif, Then, Launch, Link, Unlink, Load, New, Remove, Save, Set, SetResponse, And, and Equals. Other commands may be included.

A CommandEnable re-enables, i.e. activates or "unhides," an object that previously had been disabled. In one example, a command string may include "Enable: carcolor," where carcolor is an interrogative named carcolor. In another example, a command string may include "Enable : redcolor," where redcolor is an assertion named redcolor.

A CommandDisable disables, i.e. in-activates or hides, an object. In one example, a command string may include "Disable: carcolor," where carcolor is an interrogative named carcolor. In another example, a command string may include "Disable : redcolor," where redcolor is an assertion named redcolor. When an interrogative, an assertion, a component, or another object has been disabled, any references to it are ignored.

A CommandIf provides conditional execution of included code. In one example, a command string may include "if (carcolor.selection=yellowcolor) then." Another example may include "if (carcolor.selection !=redcolor) then." The code included within the scope of an "if" statement should be terminated by an "Endif" statement. Optionally, an "else" statement may be placed below an "if" statement and above the corresponding "endif" statement. If the argument is true, then any code appearing immediately after the "Then" is executed. If an "Else" statement is present, then code appearing between the "Then" and "Else" is executed. Any code appearing after the "Else" and before the "Endif" statement is executed if the argument is not true.

A CommandLaunch executes external programs. In one example, a command string may include "Launch: notepad.exe." In another example, a command string may include "Launch : http://oasis/seeker.jsp."

A CommandLink links one seeker to another seeker. The command link suspends execution of one seeker and continues execution using a different seeker.

A CommandLoad loads a seeker from memory. A CommandNew discontinues execution of a current seeker and starts a new seeker. A CommandRemove removes a component from a collection. A CommandSave saves a yield to memory.

A CommandSet sets the value of a variable. Other versions set a value of other objects. A CommandSetResponse sets the value of a variable to an assertion provided by a user. A CommandUnlink returns control of a seeker to a previously linked seeker.

The command buttons 1310 are configurable, similar to toolbars, and can be configured with one-click short-cuts, syntax checks, and/or help for typing commands. Commands generally are associated with actions 1314. Therefore, any action elements are eligible to accept one or more commands.

In one embodiment, a super-user using the 3D interface 1302 selects an action element once it is dropped on the GSRP 1308. A dialogue box then will open to accept one or more commands. The command buttons 1310 then are selectable to assist the user in generating the command or commands associated for that action element. When one of the command buttons 1310 are selected, the dialogue box depicts the command and prompts the super-user to input the rest of the command string for the command.

For example, an Add button may be selected. A dialogue box then may be generated with the word Add. A drop-down box may appear beside the word Add with a list of the possible extensions. The super-user then can select, for example, brackets. A list of possible components to add between the brackets may appear in another drop-down box, followed by suffix options.

In other embodiments, selecting one of the command buttons 1310 merely results in a blank dialogue box in which a super-user can enter a command string. In still other embodiments, selecting one of the command buttons 1310 results a dialogue box with the selected command, but the super-user then enters the rest of the command string. Some embodiments of the command buttons 1310 enable a super-user to select what commands are to be represented in the command buttons.

The 3D interface 1302 facilitates the simultaneous identification of a process or product and the building of a seeker because if a user can determine and identify the process or the product using a builder, including an interface such as the 3D interface 1302, thereby creating the seeker. The seeker is created while identifying the new process or project.

A user may identify and manipulate one or more elements identified in the GSRP 1308. A user may zoom into a specific view, rotate the view in any axis, including the X axis, the Y axis, and the Z axis, and position one or more elements as needed to identify a process and to build a seeker. For example, a user may zoom into a specific set of elements and create a series of potential assertions for a decision. Each assertion may have a line connecting it to a different point. The user may identify an action for two of the lines, rotate that section of the element to identify other connection points for other assertions, identify and connect other actions to those actions for those assertions, and zoom back out to see the whole process, the original view, or another view.

A super-user may operate the 3D interface 1302 as follows. In a first example, a super-user crafts a process using the 3D interface 1302 and simultaneously generates the seeker. The super-user assigns the basic elements of the process by selecting decision elements 1312 with associated assertions, actions 1314, and outputs 1316 (and inputs where needed).

The super-user can select the objects in the POSP 1304 or the objects in the ROSP 1306, drag the objects into the GSRP 1308, and place the objects where needed. Also, the user may select command buttons 1310 and make entries to dialog boxes. The user may select an object, such as by using a right mouse click. Selecting an object cause a property dialogue box to open to enable a user to enter logic, calculations, variables, identification of the next object based upon a response or action, and other advanced features. In some instances, a seeker builder can operate as a seeker itself, querying a super-user for entry of decisions, assertions, actions, or other items. For example, a seeker operating as or with the seeker builder may insure that a particular entry is added as an assertion for a particular decision each time that decision is selected and test the flow between various objects in the GSRP 1308 for connectivity and other logical tests that may identify potential loading errors before the seeker is passed into testing.

At any time, the super-user can call various elements from databases, object repositories, information repositories, and other locations as needed, as well as rotate, zoom, copy, paste, modify, and select groups or individual elements. Initially, a super-user may call up additional completed seekers to copy from, link to, and/or launch the seeker in the context of the new seeker that is being built.

Once the desired process, logic, and associated objects are in place, the super-user may save and test the seeker to insure that the functionality of the seeker is accurate. Once complete the seeker may be saved to the repository or to another system.

In the example of FIG. 13, an input object 1318 identifies the starting point of the process. An action object 1320 leads to a repository object 1322. Next, a decision node 1324 has multiple potential assertions for an interrogative, each leading to a different path to other process points. If a first assertion is selected at the decision node 1324, an output is generated via an output object 1326. If a second assertion is selected at the decision node 1324, an action object 1328 is executed, followed by a repository object 1330.

After the repository object 1330 is implemented, an output is generated using the output object 1332. If a third assertion is selected at the decision node 1324, another action object 1334 is implemented, followed by another decision node at 1336. If a first assertion is selected for the decision node 1336, an action object 1338 is executed, followed by a repository object 1340. In this example, the action object 1338 and the repository object 1340 may include emailing responses to an email or collecting information from a location and returning to the decision node 1336. If a second assertion is made at the decision node 1336, an action object 1342 is performed, followed by an associated repository object 1344. An output is generated using the output object at 1346.

Figure 14:
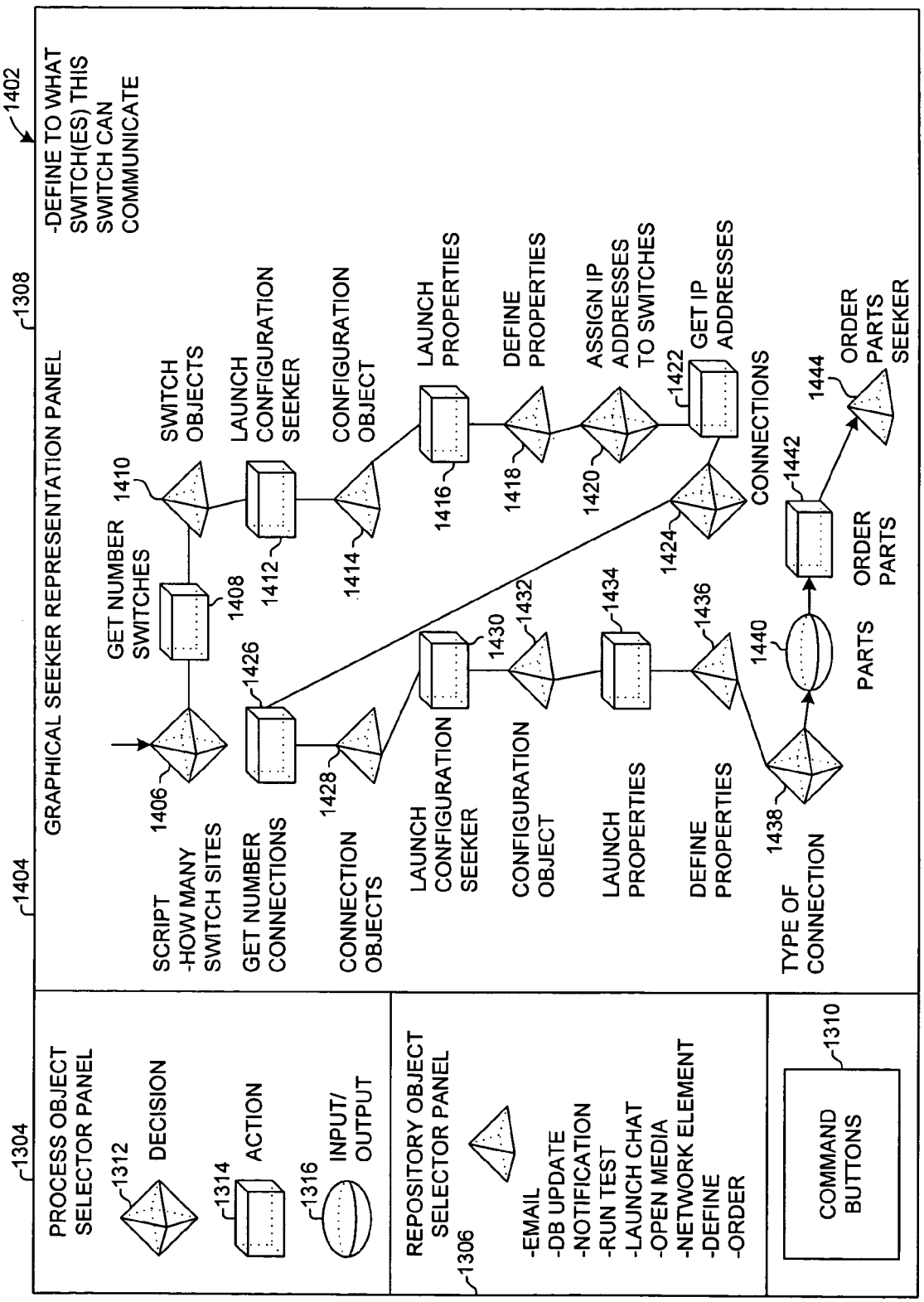
FIG. 14 is a block diagram of a three dimensional interface generating a seeker in accordance with an embodiment of the present invention.

FIG. 14 depicts an exemplary embodiment of a seeker 1402 created using the 3D interface 1404 of a builder 106D. In the example of FIG. 14, each element links only to one other element. However, in other examples, one element may link to multiple other elements, and each of those elements may link to multiple other elements.

In the example of FIG. 14, a super-user may start by selecting, dragging, and dropping a decision node 1406 to identify how many switch sites are to be in the network. The super-user selects the switch site decision node 1406 to identify the properties for the interrogative of "how many switch sites to you want?" and the potential assertions for a plurality of switch sites.

Thereafter, an action object 1408 is connected to the switch site decision node 1406 to obtain the number of switches. In this example, the super-user selects a command for the action object 1408 by selecting the Set command and entering extensions so that the command string reads "Set{ }". The super-user enters extensions to complete the command string for the Set command, such that the command string reads "Set {Switch_Size}=Small". The super-user may enter another command for the action object 1408 by selecting the Set command and entering extensions so that the command string reads "Set{ }". In this example, the super-user enters extensions to complete the command string for the Set command, such that the command string reads "Set {Switch_Size}=Small; Set {Polarity}=Positive". The super-user may enter still another command for the action object 1408 by selecting the Set command and entering extensions so that the command string reads "Set { }". In this example, the super-user enters extensions to complete the command string for the Set command, such that the command string reads "Set {Switch_Size}=Small; Set {Polarity}=Positive; Set{Current}=15 Amps".

A repository object 1410 is connected to the action element 1408. The repository object 1410 is a switch object having all of the behaviors, methods, and data for a base switch object.

An action element 1412 is connected to the instance of the switch repository object 1410. The action element 1412 is set to launch a configuration seeker. The configuration seeker will be used to configure each of the switch objects 1410 that will be generated in response to the number of switches selected by the user from the decision node 1406. The super-user then enters a command for the action object 1412 by selecting the action object, then selecting the Set command, and then entering extensions so that the command string reads "Set { }". In this example, the super-user enters extensions to complete the command string for the Set command, such that the command string reads "Set {Switch_Site_01}=East_Main". "East_Main" in this example is a switch name.

A configuration object 1414 is selected from the set of repository objects for the configuration seeker 1412. Once configured, properties will need to be defined for a configured switch.

Thus, an action element 1416 is linked to the configuration object 1414 to identify the properties for the switch. The super-user then enters a command for the action object 1416 by selecting the action object, then selecting the Add command, and then entering extensions so that the command string reads "Add[ ]". In this example, the super-user enters extensions to complete the command string for the Add command, such that the command string reads "Add[Switch_Site_Power]".

A repository object for switch properties 1418 is added to the launch properties action element 1416. A decision node 1420 is added to identify the IP addresses to be assigned to each switch.

An action element 1422 is connected to the decision node 1420 to get the IP addresses. The super-user then may enter a command for the action object 1422 by selecting the action object, then selecting the Link command, and then entering extensions so that the command string reads "Link:". In this example, the super-user enters extensions to complete the command string for the Link command, such that the command string reads "Link: 601752299". The "601752299" in this example is a product identification identifying another seeker.

Additionally, a decision node 1424 is added to identify the connections to and from each switch. An action element 1426 is connected to the connections decision node 1424 to get the number of connections. A connection object 1428 is retrieved from the repository and added to the action element 1426 for obtaining the number of connections.

A configuration seeker action element 1430 is added to obtain the configuration for each of the connections. The super-user then may enter a command for the action object 1430 by selecting the action object, then selecting the Unlink command, and then entering extensions so that the command string reads "Unlink:". In this example, the super-user enters extensions to complete the command string for the Unlink command, such that the command string reads "Unlink:". The Unlink command does not have an argument.

A repository configuration object 1432 is connected to the launch configuration seeker action element 1430. Additionally, properties for the connections must be obtained.

Thus, a launch properties action element 1434 is added along with a repository object 1436 for defining the properties of the connections. The super-user then may enter a command for the action object 1434 by selecting the action object, then selecting the Launch command, and then entering extensions so that the command string reads "Launch :". In this example, the super-user enters extensions to complete the command string for the Launch command, such that the command string reads "Launch http://seekersystem/security/login.jsp".

Finally, the connection type will be requested using the connection type decision node 1438. An output object 1440 is added to generate a report of the list of parts needed for the switch network. An action element 1442 is added to order the parts identified as the yield. Thus, an order parts seeker object 1444 is added from the repository. The super-user then may enter a command for the action object 1442 by selecting the action object, then selecting the If command, and then entering extensions so that the command string reads "If Then Endif:". In this example, the super-user enters extensions to complete the command string for the If command, such that the command string reads "If (switch_Site_01)=East_Main Then Endif". The super-user then may enter a command for the action object 1442 by selecting the action object, then selecting the Add command, and then entering extensions so that the command string reads "Add[ ]". In this example, the super-user enters extensions to complete the command string for the If and Add commands, such that the command string reads "If (switch_Site_01)=East_Main Then Add[Main-_Connection]; Endif".

Figure 15:
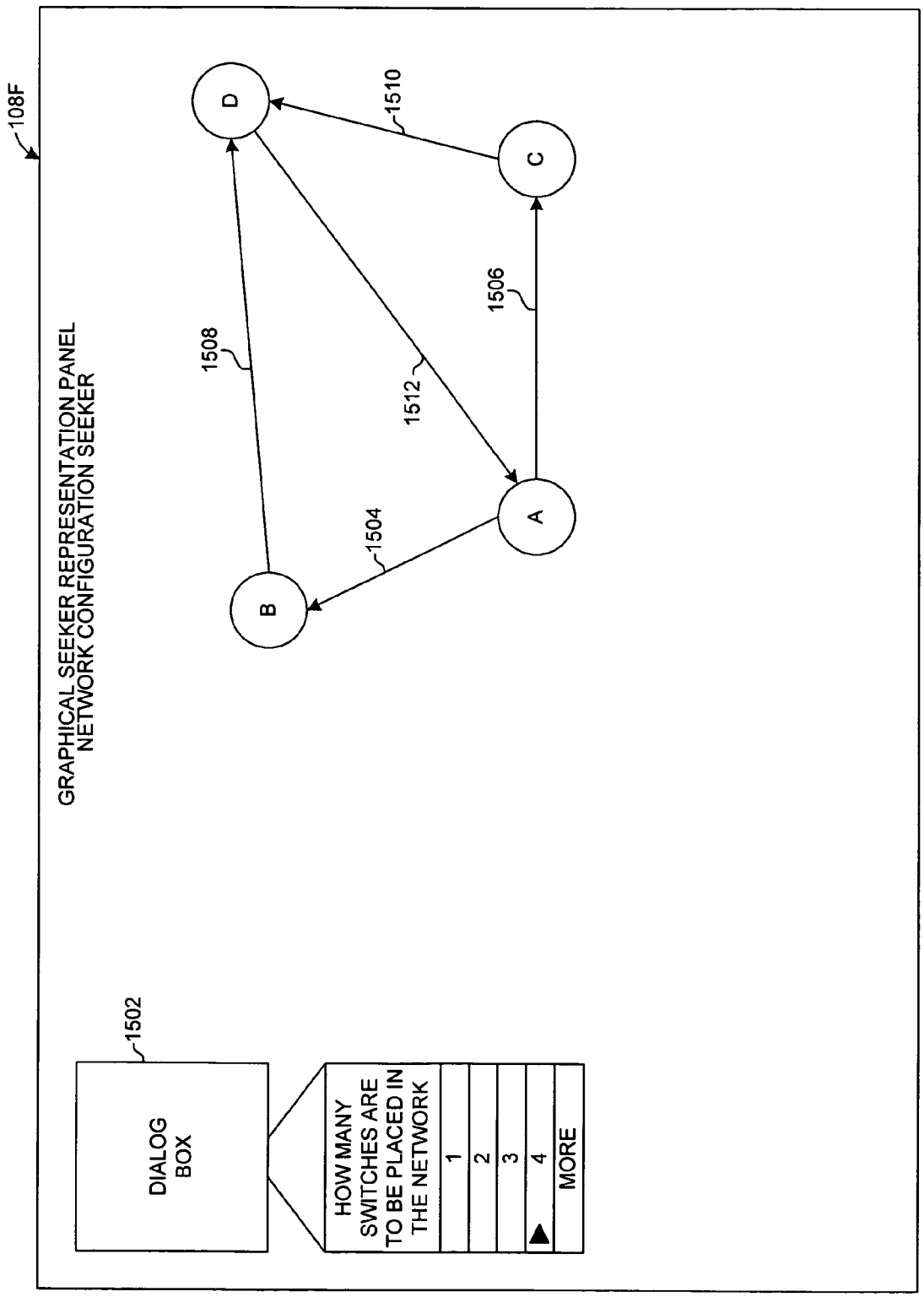
FIG. 15 is a block diagram of a seeker operating in accordance with an embodiment of the present invention.

FIG. 15 depicts an exemplary embodiment of a seeker operating from a catalyst. In the example of FIG. 15, the seeker 108F is the seeker created in the embodiment of FIG. 14. A user selects the seeker, which launches an instance of the seeker 108F and an instance of the catalyst.

A dialog box 1502 is generated requesting the number of switches to be placed in the network. The dialog box 1502 further may contain a drop down box with potential assertion or a text entry box for entry of an assertion. In this example, the user designates four switches in response to the dialog box request. The seeker 108F generates four switches A, B, C, and D for display to the screen. In this example, another dialog box 1502 is generated instructing the user to sequentially select each switch to identify the configuration of each switch. In one example, the user may select a switch A-D by placing the cursor on the switch and right-clicking a mouse button or another pointer input. In this example, this action results in another dialog box 1502 being generated to the monitor. This dialog box 1502 includes an identification for each of the configuration parameters and a drop down box or text entry location at which the parameters may be entered by the user. The user sequentially enters the parameters for the configuration of each switch A-D using this method. If the user does not select a switch for configuration, another dialog box 1502 will be generated instructing the user to configure that particular switch. Configuration parameters may include, for example, bandwidth requirements and power requirements.

Once each switch A-D is configured, another dialog box 1502 is generated requesting the properties for each switch. The dialog box 1502 instructs the user to sequentially select each switch A-D to define the properties for that switch. Once a switch has been selected, another dialog box 1502 is generated identifying each switch property and providing a drop down selection box by which a user can select a property option for each property interrogative. Properties may include, for example, if the switch is an ATM switch or an IP switch. In this example, the switches A-D are IP switches.

Once the configurations and properties are identified for each switch A-D, another dialog box 1502 is generated requesting the identification of the IP address for each switch. In this example, a separate dialog box 1502 is generated sequentially to request and accept entry of the IP address for each switch A-D. Next, a dialog box 1502 is generated instructing the user to identify the connections to and from each switch A-D by drawing a line from and to the switches for the connections. The user then draws a line 1504 from a first switch, such as switch A, to the second switch, such as switch B. The line 1504 represents the connection between switch A and switch B. The user then draws the other lines 1506-1512 between the switches A-D to represent the connections that are possible between the switches.

The seeker 108F then generates another dialog box 1502 instructing the user to select each line 1504-1512 sequentially to configure that connection. Alternately, a dialog box 1502 can be generated sequentially for each line 1504-1512 requesting the configuration for that connection or requesting the user to select the line to configure that connection. In this example, the user sets the configuration and the properties of each connection simultaneously. For example, the user may place the cursor on the first line 1504 and select the line by clicking a mouse button or another pointer input. Thereafter, a dialog box 1502 will be generated identifying the configuration items and the property items and providing entry points or drop down selection boxes for the configuration items and the property items. Within that dialog box 1502 a request is made to identify the connection type for that connection. For example, a user may identify the connection as being an ATM connection. Further, the user may configure the virtual paths/virtual connections (VPs/VCs) for the ATM connection. Other configuration elements and property elements may be identified.

At this point, the configuration of the switches A-D and the connections 1504-1512 are complete for the network generated by the seeker 108F. The seeker 108F then generates as the yield a report identifying the parts that are to be ordered for the identified network. Additionally, the seeker 108F executes an automated object to transmit one or more orders identifying the part names and quantities to one or more vendors to order the parts. The automated object includes payment data.

Those skilled in the art will appreciate that variations from the specific embodiments disclosed above are contemplated by the invention. The invention should not be restricted to the above embodiments, but should be measured by the following claims.

What is claimed is:

1. A computerized method for determining requirements for a yield comprising:
   building a seeker with a builder, the seeker comprising at least one interrogative, at least one potential assertion, and logic associated with a combination of the at least one interrogative and at least one assertion provided in response to the at least one interrogative and the at least one potential assertion;
   operating the seeker with a catalyst and, based on the at least one interrogative and 10 the at least one assertion, executing the logic to select at least one component for the yield; and
   generating the yield with the seeker, the yield comprising the at least one component.

2. The computerized method of claim 1 further comprising operating with a controller at least one member of a group consisting of the builder and the catalyst.

3. The computerized method of claim 2 wherein the builder comprises builder programming language code, the controller comprises a user interface, a processor, and memory, and the computerized method further comprises:
   generating the builder programming code with the processor, the builder programming code generating an order in which the at least one interrogative and the at least one potential assertion are provided to the user interface and generating the logic associating the combination of the at least one inteffogative and the at least one assertion;
   receiving input data at the user interface, the input data identifying the at least one assertion;
   storing the input data in the memory;
   transmitting the input data to the processor; and
   processing the input data and the builder programming language code to generate the seeker and to select the at least one component for the yield.

4. The computerized method of claim 3 further comprising generating other data for manifestation at the user interface.

5. The computerized method of claim 3 wherein receiving the input data at the user interface comprises receiving the input data at least one member of a group consisting of a graphical user interface, a voice recognition interface, a voice activated interface, a voice generation interface, a video interface, and an audio interface.

6. The computerized method of claim 3 further comprising receiving other data at an input/output interface from an external device and processing the other data and the builder programming language code with the processor to select the at least one component for the yield.

7. The computerized method of claim 2 further comprising:
   receiving input data at a user interface;
   transmitting the input data to a processor; and
   processing the seeker and input data with the processor to generate the seeker and to select the at least one component for the yield.

8. The computerized method of claim 7 further comprising generating other data for manifestation at the user interface.

9. The computerized method of claim 7 wherein receiving the input data at the user interface comprises receiving the input data at least one member of a group consisting of a graphical user interface, a voice recognition interface, a voice activated interface, a voice generation interface, a video interface, and an audio interface.

10. The computerized method of claim 7 further comprising receiving other data at an input/output interface from an external device and processing the other data and the seeker with the processor to select the at least one component for the yield.

11. The computerized method of claim 1 further comprising storing other data at a repository, the other data used by at least one member of a group consisting of the builder and the catalyst.

12. The computerized method of claim 1 further comprising storing objects at a repository, the objects used by the builder to build the seeker.

13. The computerized method of claim 12 wherein storing the objects at the repository comprises storing at least one member of a group consisting of a decision node, an action node, an input node, an output node, a pipe node, a process node, a smart component node, a define object, an order object, a network element object, an email object, a database update object, a notification object, a run test object, a launch chat object, an open media object, an open link object, a get data object, and a help link object.

14. The computerized method of claim 1 further comprising storing objects at a repository, the objects used by the catalyst to process the seeker.

15. The computerized method of claim 14 wherein storing the objects at the repository comprises storing at least one member of a group consisting of a decision node instance, an action node instance, an input node instance, an output node instance, a pipe node instance, a process node instance, a smart component node instance, a define object, an order object, a network element object, an email object, a database update object, a notification object, a run test object, a launch chat object, an open media object, an open link object, a get data object, and a help link object.

16. The computerized method of claim 1 further comprising using a security system to govern access to at least one member of a group consisting of the builder and the seeker.

17. The computerized method of claim 1 further comprising accessing the builder with a super-user system and generating the seeker from the super-user system.

18. The computerized method of claim 1 further comprising accessing the seeker with a user system and launching the catalyst from the user system to operate the seeker.

19. A computerized method for building a seeker, the computerized method comprising:
generating a plurality of interrogatives and a plurality of potential assertions with a builder;
associating each interrogative to at least one corresponding potential assertion; and
generating a plurality of command strings with the builder, at least one command string corresponding to each combination of each interrogative and the at least one corresponding potential assertion.

20. A computerized method for determining a yield comprising:
generating a plurality of interrogatives and a plurality of potential assertions with a seeker, at least one potential assertion associated for each interrogative;
processing a plurality of command strings and a plurality of assertions with a catalyst, each command string corresponding to a combination of one of the interrogatives and the associated at least one potential assertion, each assertion corresponding to the combinatory of one of the interrogatives and the associated at least one potential assertion; and
selecting at least one component for the yield based on the processed plurality of command strings and plurality of assertions.

21. A computerized method for determining a seeker comprising:
receiving an input at an input manager and generating a command string corresponding to the input;
receiving the command string from the input manager at a process manager;
passing the command string from the process manager to a builder interpreter;
executing a command method corresponding to the command string at the builder interpreter and, in response, identifying a data component for the seeker;
passing the data component from the builder interpreter to a builder collector; and
storing the data component at the builder collector.

22. The computerized method of claim 21 further comprising creating an instance of a command object at the builder interpreter prior to executing the command, the command object instance having the command method.

23. The computerized method of claim 21 further comprising:
creating a command factory at the builder interpreter;
passing the command string from the builder interpreter to the command factory;
creating an instance of a command object at the command factory, the command object instance having the command method; and
passing the command method to the builder interpreter for execution.

24. The computerized method of claim 23 wherein the command method comprises an execute method and the method further comprises executing the execute method at the builder interpreter.

25. The computerized method of claim 21 wherein the input comprises a command, and the computerized method further comprises:
receiving the command at the input manager as the input and, in response, generating a command request for additional input;
receiving the additional input; and
creating the command string using the command and the additional input.

26. The computerized method of claim 25 further comprising:
passing the command request from the input manager to a display manager; and
rendering the command request for the additional input at the display manager.

27. The computerized method of claim 26 wherein rendering the command request with the display manager comprises generating for display a dialogue box identifying a request for additional input.

28. The computerized method of claim 26 wherein rendering the command request with the display manager comprises generating an audio simulated voice identifying a request for additional input.

29. The computerized method of claim 21 further comprising rendering an interface identifying an option for the input with a display manager.

30. The computerized method of claim 29 wherein rendering the interface identifying the option comprises rendering a display interface with at least one member of a group consisting of a text entry box, a drop down box, and a command selection.

31. The computerized method of claim 29 wherein rendering the interface identifying the option comprises rendering an audio interface having an audio simulated voice identifying at least one member of a group consisting of a verbal entry, a verbal selection list, and a verbal command selection.

32. The computerized method of claim 21 further comprising rendering the data component with a display manager.

33. The computerized method of claim 32 wherein rendering the data component with the display manager comprises using at least one member of a group consisting of a display interface and an audio interface.

34. The computerized method of claim 32 further comprising:
   passing a command request for additional information from the input manager to the process manager;
   retrieving the additional information from a repository using the process manager; and
   transmitting the additional information to the input manager.

35. The computerized method of claim 21 further comprising:
   creating an instance of a command object with a command factory, the command object instance having the command method; and
   passing the command object instance to the builder interpreter for executing the command method.

36. The computerized method of claim 21 further comprising:
   executing the command method corresponding to the command string at the builder interpreter and, in response, identifying the plurality of data components for the seeker;
   passing the plurality of data components from the builder interpreter to the builder collector; and
   storing the plurality of data components at the builder collector.

37. The computerized method of claim 21 wherein the data component comprises a data object, and storing the data component comprises storing the data object using the builder collector.

38. The computerized method of claim 21 further comprising distributing a plurality of data components for the seeker to a deployment location using a deployment manager.

39. The computerized method of claim 21 further comprising generating an execution of the command method to an output device using a debug manager.

40. The computerized method of claim 39 further comprising configuring the debug manager with an on mode in which a data stream identifying the command method execution is transmitted to the output device and an off mode in which the data stream identifying the command method execution is not transmitted to the output device.

41. The m computerized method of claim 21 further comprising executing at least one base node according to a type, the base node comprising at least one base method and base data for the type.

42. The computerized method of claim 41 configuring the type as at least one member of a group consisting of a decision node, a process node, a pipe node, an output node, and a smart component node.

43. The computerized method of claim 41 wherein the type comprises a decision node and executing the at least one base node comprises executing the base method and the base data to generate an interrogative for which at least one assertion is receivable.

44. The computerized method of claim 41 wherein the type comprises a process node and executing the at least one base node comprises executing the base method and the base data to generate text.

45. The computerized method of claim 41 wherein the type comprises a process node and executing the at least one base node comprises executing the base method and the base data to generate a process.

46. The computerized method of claim 41 wherein the type comprises a pipe node and executing the at least one base node comprises executing the base method and the base data to connect at least two objects.

47. The computerized method of claim 41 wherein the type comprises an output node and executing the at least one base node comprises executing the base method and the base data to identify an output type and an output location for a yield of the seeker.

48. The computerized method of claim 41 wherein the type comprises a smart component node and executing the at least one base node comprises executing the base method and data to execute an automated process.

49. The computerized method of claim 41 further comprising configuring the base node with:
   a node property comprising at least one property and an argument for the type; and
   a node position comprising positioning information identifying a position for an output at which the base node is located.

50. The computerized method of claim 41 wherein the base node comprises a smart component comprising at least one smart method, and the method further comprises executing the smart method to result in at least one member of a group consisting of automating a process and rendering a data component.

51. A computerized method for determining a seeker comprising:
   receiving an input at an input manager and, in response thereto, generating a command string corresponding to the input;
   passing the command string to a process manager and, in response thereto, creating an interpreter;
   passing the command string to the interpreter and, in response thereto, creating a command factory;
   passing the command string from the interpreter to the command factory and, in response thereto, creating an instance of a command object with the command factory, the command object comprising an execute method having a command;
   passing the command object instance from the command factory to the interpreter;
   executing the execute method of the command object instance at the interpreter, and thereafter, identifying a data component for the seeker;
   passing the data component from the interpreter to the process manager; and
   storing the data component in a collector by the process manager.

52. A computerized method for processing a seeker comprising:

generating at least one interrogative and at least one potential assertion from a flow manager;

receiving at least one assertion at the flow manager in response to the at least one interrogative and the at least one potential assertion;

processing logic for the at least one interrogative and the at least one assertion at the flow manager and, in response, selecting at least one component having at least one variable for a yield; and storing the at least one component having the at least one variable for the yield at a yield manger.

53. The computerized method of claim 52 wherein the logic comprises at least one command string set and the method comprises processing the at least one command string set at the flow manager to select the at least one component having the at least one variable for the yield.

54. The computerized method of claim 52 further comprising rendering the at least one inteffogative and the at least one potential assertion at a user interface.

55. The computerized method of claim 52 further comprising rendering the at least one interrogative and the at least one potential assertion at least one user interface selected from a group consisting of a graphical user interface, a voice simulated interface, a voice response interface, and a voice activated interface.

56. The computerized method of claim 52 further comprising receiving the at least one assertion as an input at a user interface.

57. The computerized method of claim 52 further comprising receiving the at least one assertion as an input at least one user interface selected from a group consisting of a graphical user interface, a voice simulated interface, a voice response interface, and a voice activated interface.

58. The computerized method of claim 52 further comprising:

generating a plurality of interrogatives and a plurality of potential assertions at the flow manager;

receiving and processing a plurality of assertions at the flow manager, at least one assertion corresponding to each interrogative, and, thereafter, selecting a plurality of components at the flow manager for the yield, each component having at least one variable; and storing the plurality of components, each having at least one variable, for the yield at the yield manager.

59. The computerized method of claim 58 further comprising rendering the interrogatives and the potential assertions with a user interface.

60. The computerized method of claim 58 further comprising rendering the interrogatives and the potential assertions with at least one user interface selected from a group consisting of a graphical user interface, a voice simulated interface, a voice response interface, and a voice activated interface.

61. The computerized method of claim 58 further comprising receiving the assertions as inputs at a user interface.

62. The computerized method of claim 58 further comprising receiving the assertions as inputs at least one user interface selected from a group consisting of a graphical user interface, a voice simulated interface, a voice response interface, and a voice activated interface.

63. The computerized method of claim 52 wherein the logic comprises interpretive logic and the computerized method further comprises:

configuring a component store with a component list having a component identification for each of a plurality of components, each component identification having a corresponding type;

generating at least one inteffogative object from the at least one interrogative, the at least one inteffogative object having interrogative data and the at least one potential assertion;

generating at least one assertion object from the at least one assertion in response to the at least one inteffogative object;

passing the at least one interrogative object and the at least one assertion object to the interpretive logic;

selecting at least one command string set in response to receiving the at least one interrogative object and the at least one assertion object at the interpretive logic;

passing the command string set from the interpretive logic to an interpreter; and executing at least one command method corresponding to the at least one command string set at the interpreter and, in response, selecting at least one component from the component list for the yield.

64. The computerized method of claim 63 further comprising configuring the at least one inteffogative as at least one member of a group consisting of a question inteffogative, a listener inteffogative, and a component execution interrogative.

65. The computerized method of claim 63 further comprising:

selecting the at least one assertion object in response to the at least one interrogative; and configuring the at least one assertion object with a reference to a next interrogative.

66. The computerized method of claim 63 further comprising setting at least one variable for the at least one component for the yield at the interpreter.

67. The computerized method of claim 63 further comprising:

passing the at least one command string set from the interpreter to a command factory;

creating at least one command object at the command factory, the at least one command object having the at least one command method and corresponding to the at least one command string set; and passing the at least one command object to the interpreter.

68. The computerized method of claim 63 further comprising:

creating a command factory at the interpreter;

passing the at least one command string set from the interpreter to the command factory;

creating a plurality of command objects at the command factory corresponding to the at least one command string set, each command object having a corresponding command method;

passing the command objects from the command factory to the interpreter; and executing the corresponding command methods of the command objects and, in response, performing at least one member of a group consisting of selecting a plurality of components from the component store for the yield, selecting the at least one component and setting at least one variable for the at least one component, and setting a plurality of other variables for a plurality of other components.

69. The computerized method of claim 63 further comprising:
- creating a command factory at the interpreter;
- passing the command string set from the interpreter to the command factory;
- creating at least one command object at the command factory, the at least one command object having the command method and corresponding to the command string set; and
- passing the at least one command object from the command factory to the interpreter.

70. The computerized method of claim 63 further comprising modifying the at least one component with native code when the at least one component is added to the yield.

71. The computerized method of claim 52 further comprising:
- storing anti-logic corresponding to the processed logic in a reversal block;
- storing the at least one assertion received in response to the at least one interrogative in response history;
- storing the at least one variable for the at least one component in a yield variable; and
- storing the at least one component in a yield collector.

72. The computerized method of claim 52 wherein: storing the at least one component having the at least one variable for the yield at the yield manger comprises:
- storing anti-logic corresponding to the processed logic in a reversal block;
- storing the at least one assertion received in response to the at least one interrogative in a response history;
- storing the at least one variable for the at least one component in a yield variables; and
- storing the at least one component in a yield collector; and the method further comprises:
- configuring a component store with a component list having a component identification for the at least one component and a plurality of other components, each component identification having a corresponding type;
- generating at least one inteffogative object from the at least one interrogative, the at least one inteffogative object having interrogative data and the at least one potential assertion;
- generating at least one assertion object from the at least one assertion in response to the at least one inteffogative object;
- passing the at least one interrogative object and the at least one assertion object to the response history;
- passing the at least one interrogative object and the at least one assertion object to the interpretive logic;
- selecting at least one command string set in response to receiving the at least one interrogative object and the at least one assertion object at the interpretive logic;
- passing the at least one command string set from the interpretive logic to an interpreter;
- executing at least one command method corresponding to the at least one command string set at the interpreter and, in response, selecting the at least one component from the component list for the yield;
- setting the at least one variable in the yield variables; and
- creating the anti-logic opposing the executed at least one command method.

73. A computerized method for determining requirements for a seeker comprising:
- connecting a super-user to a server via a connection;
- accessing a repository from the server to create an instance of a builder;
- transmitting the builder instance from the server to the super-user; and
- operating the builder instance at the super-user and generating the seeker configured with a plurality of interrogatives, a plurality of potential assertions, and a plurality of command strings, at least one potential assertion corresponding to each interrogative, and at least one command string associated to each combination of the at least one potential assertion and the corresponding interrogative.

74. The computerized method of claim 73 wherein connecting the super-user to the server via the connection comprises connecting the super-user to the server via an internet protocol connection.

75. A computerized method for determining requirements for a seeker comprising:
- accessing a repository from a server, the repository comprising a builder;
- creating an instance of the builder and making the builder instance operational from the server;
- connecting a super-user to the server via a connection; and
- operating the builder instance from the server and generating a seeker configured with a plurality of interrogatives, a plurality of potential assertions, and a plurality of command strings, at least one potential assertion corresponding to each interrogative, and at least one command string associated to each combination of the at least one potential assertion and the corresponding interrogative.

76. A computerized method for determining requirements for a seeker comprising:
- accessing a repository from a server, the repository comprising a builder;
- creating an instance of the builder and making the builder instance operational from the server;
- connecting a super-user to the server via a connection; and
- operating the builder instance from the server and generating a seeker configured with a plurality of interrogatives, a plurality of potential assertions, and a plurality of command strings, at least one potential assertion corresponding to each interrogative, and at least one command string associated to each combination of the at least one potential assertion and the corresponding interrogative.

77. The computerized method of claim 76 wherein connecting the user system to the server via the connection comprises connecting the user system to the server via an internet protocol connection.

78. A computerized method for determining requirements for a yield comprising:
- accessing a repository from a server, the repository comprising a seeker and a catalyst;
- creating an instance of the catalyst and an instance of the seeker;
- making the seeker instance operational with the catalyst instance from the server;
- connecting a user system to the server via a connection;
- launching the catalyst instance with the seeker instance from the server; and
- operating the seeker from the server to generate the yield.

79. A computerized method for generating a performance tool comprising:
- configuring a process object panel with a plurality of process objects;
- configuring a repository object panel with a plurality of repository objects;

configuring a graphic seeker representation panel to receive a plurality of seeker objects represented three dimensionally, each seeker object connected to at least one other seeker object; and identifying a three dimensional seeker process with the graphic representation panel with the plurality of seeker objects represented three dimensionally, the plurality of seeker objects comprising at least one member of a group consisting of at least one of the plurality of process objects and at least one of the plurality of repository objects.

80. The computerized method of claim 79 further comprising generating at least one command for at least one command button for at least one of the seeker objects added to the graphic seeker representation panel.

81. The computerized method of claim 80 further comprising enabling entry of an argument with the at least one command button after the at least one command is generated.

82. The computerized method of claim 80 wherein generating the at least one command for the at least one command button comprises generating the at least one command from at least one member of a group consisting of create decision, create pipe, create process, create output, create smart component, enable, disable, if, endive, then, launch, link, unlink, load, new, remove, save, and, set, set response, and equals.

83. The computerized method of claim 79 further comprising configuring the process object panel for at least one process of a group consisting of:

generating from a decision element at least one inteffogative with at least one corresponding potential assertion from which at least one assertion may be selected as a decision;

identifying from an action element an action to be taken in response to a selected assertion or in response to a selected output;

identifying from an input at least some input data needed for the action or the decision; and identifying from an output element an outcome of the action or the decision.

84. The computerized method of claim 79 further comprising configuring the repository object panel with at least one member of a group consisting of a define object, an order object, a network element object, an email object, a database update object, a notification object, a run test object, a launch chat object, an open media object, an open link object, a get data object, and a help link object.

85. A computerized method for generating a performance tool comprising:

configuring a plurality of components each having a component identification and a type;

configuring at least one inteffogative with interrogative data;

configuring at least one potential assertion with assertion data selectable in response to the at least one interrogative; and configuring at least one command string set corresponding to a combination of the at least one inteffogative and a selected at least one potential assertion that, when processed for execution and executed, is configured to cause selection of at least one of the components for a yield.

86. A computerized method for determining requirements for a yield comprising:

configuring a builder to build a seeker;

configuring the seeker with a plurality of interrogatives and a plurality of potential assertions, a selected one of the plurality of potential assertions corresponding to each interrogative;

configuring a catalyst to operate the seeker;

generating the interrogatives and the potential assertions from the seeker and, in response thereto, receiving selected assertions; and generating the yield with the seeker as a solution based on the interrogatives and the selected assertions.

87. A computerized method for determining a yield comprising:

configuring a seeker with a plurality of interrogatives and a plurality of potential assertions, a selected one of the plurality of assertions corresponding to each interrogative;

configuring a catalyst to operate the seeker;

generating the interrogatives and the potential assertions from the seeker and, in response thereto, receiving selected assertions; and generating the yield from the seeker as a solution based on the interrogatives and the selected assertions.

* * * * *

UNITED STATES PATENT AND TRADEMARK OFFICE
CERTIFICATE OF CORRECTION

| | | |
|---|---|---|
| PATENT NO. | : 7,444,627 B2 | Page 1 of 1 |
| APPLICATION NO. | : 10/920878 | |
| DATED | : October 28, 2008 | |
| INVENTOR(S) | : Aldrich et al. | |

It is certified that error appears in the above-identified patent and that said Letters Patent is hereby corrected as shown below:

Col. 49 Claim 54, Line 21, "inteffogative" should read --interrogative--.

Col. 50 Claim 63, Line 6, "inteffogative" should read --interrogative--.

Col. 50 Claim 63, Line 10, "inteffogative" should read --interrogative--.

Col. 50 Claim 64, Line 25, "inteffogative" should read --interrogative--.

Col. 50 Claim 64, Line 26, "inteffogative" should read --interrogative--.

Col. 50 Claim 64, Line 27, "inteffogative" should read --interrogative--.

Col. 51 Claim 72, Line 39, "inteffogative" should read --interrogative--.

Col. 51 Claim 72, Line 40, "inteffogative" should read --interrogative--.

Col. 51 Claim 72, Line 44, "inteffogative" should read --interrogative--.

Col. 53 Claim 83, Line 29, "inteffogative" should read --interrogative--.

Col. 54 Claim 85, Line 8, "inteffogative" should read --interrogative--.

Col. 54 Claim 85, Line 14, "inteffogative" should read --interrogative--.

Signed and Sealed this

Fifteenth Day of September, 2009

David J. Kappos
*Director of the United States Patent and Trademark Office*